(12) United States Patent
Duchene et al.

(10) Patent No.: US 11,054,355 B2
(45) Date of Patent: Jul. 6, 2021

(54) DEVICES AND METHODS FOR DETERMINING THE DENSITY OF INSULATION

(71) Applicant: CertainTeed LLC, Malvern, PA (US)

(72) Inventors: Glenn Allan Duchene, Malborough, MA (US); Vivek Singh, Boston, MA (US); Mickael Boinet, Northboro, MA (US); Remi J. Goulet, Sturbridge, MA (US)

(73) Assignee: CertainTeed LLC, Malvern, PA (US)

( * ) Notice: Subject to any disclaimer, the term of this patent is extended or adjusted under 35 U.S.C. 154(b) by 205 days.

(21) Appl. No.: 16/023,517

(22) Filed: Jun. 29, 2018

(65) Prior Publication Data

US 2019/0003948 A1 Jan. 3, 2019

Related U.S. Application Data

(60) Provisional application No. 62/527,618, filed on Jun. 30, 2017, provisional application No. 62/651,095, filed on Mar. 31, 2018.

(51) Int. Cl.
*G01N 9/34* (2006.01)

(52) U.S. Cl.
CPC ..................... *G01N 9/34* (2013.01)

(58) Field of Classification Search
CPC ..................................... G01N 9/34
USPC ....................................... 73/32 A
See application file for complete search history.

(56) References Cited

U.S. PATENT DOCUMENTS

| 3,382,706 | A | * | 5/1968 | Fitzgerald ............ G01N 11/162 73/54.25 |
| 4,672,851 | A | | 6/1987 | Blessing |
| 5,477,726 | A | | 12/1995 | Stabinger et al. |
| 6,269,686 | B1 | | 8/2001 | Hahn et al. |
| 6,311,549 | B1 | | 11/2001 | Thundat et al. |
| 7,055,370 | B2 | | 6/2006 | Tinianov et al. |

(Continued)

FOREIGN PATENT DOCUMENTS

| JP | 4388614 B2 | 12/2009 |
| WO | WO 2016204735 A1 | 12/2016 |

OTHER PUBLICATIONS

International Search Report issued in co-pending International Patent Application PCT/US2018/040301, ISA/KR, Korean Intellectual Property Office, dated Nov. 6, 2018, 5 pages.

(Continued)

*Primary Examiner* — Jamel E Williams
(74) *Attorney, Agent, or Firm* — McDonnell Boehnen Hulbert & Berghoff LLP

(57) ABSTRACT

The present disclosure relates to devices and methods for determining the density of insulation (e.g., in a cavity). For example, one aspect of the disclosure is a device that includes a probe, an actuator, a sensor, and a control system. The control system is configured to cause the actuator to oscillate the probe. The sensor is configured to generate a signal that represents the density of insulation. Another aspect of the disclosure relates to a method for determining the density of insulation. The method includes placing a probe into contact with the insulation, causing, via an actuator, the probe to oscillate while in contact with the insulation, and generating, via a sensor, a signal that represents the density of insulation.

21 Claims, 12 Drawing Sheets

(56) References Cited

U.S. PATENT DOCUMENTS

| | | | |
|---|---|---|---|
| 7,254,987 B2 | 8/2007 | Tinianov et al. | |
| 2002/0101125 A1* | 8/2002 | Ibuki | H02P 25/032 |
| | | | 310/114 |
| 2005/0009197 A1 | 1/2005 | Adams et al. | |
| 2005/0102971 A1* | 5/2005 | O'Leary | E04B 1/7604 |
| | | | 52/782.1 |
| 2006/0150715 A1 | 7/2006 | Tinianov et al. | |
| 2008/0078245 A1* | 4/2008 | O'Leary | G01N 9/02 |
| | | | 73/32 R |
| 2010/0058836 A9 | 3/2010 | O'Leary | |
| 2015/0233808 A1* | 8/2015 | Motoyoshi | G01N 11/16 |
| | | | 702/50 |
| 2015/0374275 A1* | 12/2015 | Peipsi | G01N 3/42 |
| | | | 600/587 |
| 2018/0061612 A1* | 3/2018 | Neuman | H01J 37/261 |
| 2019/0383775 A1* | 12/2019 | Rinne | G01N 29/11 |

OTHER PUBLICATIONS

Written Opinion issued in co-pending International Patent Application PCT/US2018/040301, ISA/KR, Korean Intelleclual Property Office, dated Nov. 6, 2018, 8 pages.

* cited by examiner

Actual Insulation (test sample)

DEVICES AND METHODS FOR DETERMINING THE DENSITY OF INSULATION

CROSS-REFERENCE TO RELATED APPLICATIONS

This application claims the benefit of U.S. Provisional Patent Application No. 62/527,618, filed on Jun. 30, 2017, and of U.S. Provisional Patent Application No. 62/651,095, filed Mar. 31, 2018, the contents of each of which are incorporated herein by reference in their entirety.

BACKGROUND OF THE DISCLOSURE

1. Field of the Disclosure

The present disclosure relates generally to devices and methods for determining the degree of fill or density of insulation (e.g., in a cavity). The present disclosure relates more particularly to devices or methods for inserting a probe into insulation material and determining the degree of fill or density of the insulation within the cavity based on the degree to which the insulation resists movement of the probe.

2. Technical Background

Insulation materials such as fiberglass batts, rolls, blankets, or blown-in insulation are typically used to reduce the rate of heat transfer between two areas separated by a boundary. For example, in an attic, insulation material can be applied to the interior surface of the roof deck to slow the transfer of heat through the roof deck, that is, from the exterior of the house to the attic or vice versa. In another application, insulation material is applied to exterior walls (e.g., between wood studs) and covered with wallboards to slow the rate of heat transfer through the exterior wall and the wallboard.

In some instances, it is useful to determine the density (e.g., degree of fill) of insulation material within a cavity. For example, in a retrofit application, a technician might determine the density of insulation within an existing cavity to determine what changes, if any, need to be made to make the insulation conform to a density required by an updated building code. In another example, the technician uses a blower to blow loose insulation material into a cavity. In this case, the technician might keep track of the quantity (e.g., weight or volume) of the insulation blown into the cavity and compare that to the volume of the cavity to determine the density of the blown-in insulation. This technique relies on the assumption that the insulation blown into the cavity has a uniform density, which might not be the case.

Another known method for determining a density of insulation within a cavity involves inferring the density from the amount a sound wave of known initial intensity is attenuated or dampened as the sound wave travels a known distance through the insulation. Unfortunately, this method has disadvantages. Acoustic contamination (noise) that is often present at construction sites due to drilling, hammering, stapling, sawing etc. can interfere with this method. For example, if the acoustic noise includes the same or nearly the same acoustic frequencies as the test sound wave, it might be difficult or impossible to distinguish the acoustic noise from the attenuated test sound wave.

There are other ways of measuring the density of loose insulation, including the method of the Cubic Foot Density Test (Blow-In-Blanket© Contractors Association—2008) and the Densi-Checker™ offered by Johns Manville for their Jet Spray insulation. However, these methods are destructive in nature, requiring that the area of test be repaired after sampling. It also is less practical to test multiple locations, because of the time involved and the multiple repairs that are required. Off-site testing may be performed as described in "Standard Practice for Determination of Thermal Resistance of Loose-Fill Building Insulation in Side Wall Applications by ASTM Task Group for Sidewall R-value Loose Fill (ATS-4)." This technique suffers from the time required for testing, and that the results from the sample may not necessarily be representative of the product as installed in the field.

Accordingly, what are needed are improved methods and devices for determining the density of insulation in a cavity.

SUMMARY OF THE DISCLOSURE

One aspect of the disclosure is a device for determining the density of insulation (e.g., in a cavity), the device comprising:
  a probe configured to be inserted into insulation such that the probe contacts the insulation;
  an actuator configured to cause the probe to oscillate;
  a sensor configured to sense the oscillation of the probe; and
  a control system configured to cause the actuator to oscillate the probe,
  the sensor being configured to generate a signal that represents the density of insulation.

Another aspect of the disclosure is a method for determining the density of insulation (e.g., in a cavity), for example, using a device as described above, the method comprising:
  placing a probe into contact with the insulation;
  causing, via an actuator, the probe to oscillate while in contact with the insulation; and
  generating, via a sensor, a signal that represents the density of insulation.

Another aspect of the disclosure is a device for determining the density of insulation, the device comprising:
  a probe configured to be inserted into insulation such that the probe contacts the insulation;
  a base component to which the probe is mechanically coupled; and
  a sensor configured to generate a signal representing displacement and/or velocity of the probe within the insulation, wherein the displacement and/or velocity of the probe indicates the density of insulation.

Another aspect of the disclosure is a method for determining the density of insulation (e.g., within a cavity), for example, using a device as described above, the method comprising:
  placing a probe into contact with the insulation;
  displacing the probe in a first direction such that potential energy is stored;
  releasing the probe such that the probe (a) moves in a second direction to reach a point of maximum displacement in the second direction, the second direction being opposite the first direction, and/or (b) moves back in the first direction after reaching the point of maximum displacement; and
  generating, via a sensor, a signal that indicates the point of maximum displacement.

Additional aspects will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1A:
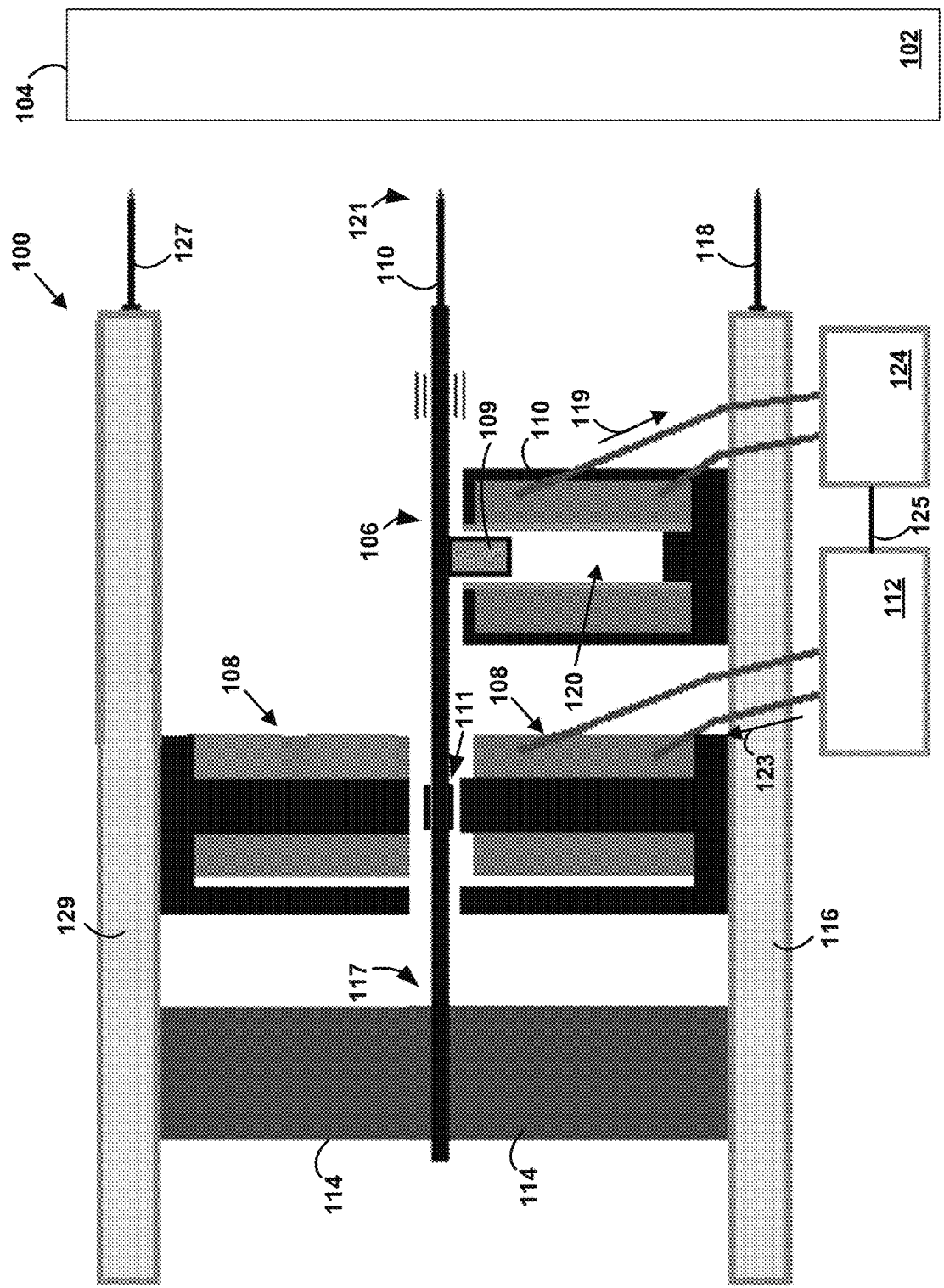
FIG. 1A is a schematic view of a device for determining the density of insulation in a cavity according to one embodiment of the disclosure.

As noted above, the present inventors have noted disadvantages of existing processes for determining the density of insulation. Accordingly, one aspect of the disclosure is a device for determining the density of insulation (e.g., in a cavity). The device includes a probe configured to be inserted into insulation such that the probe contacts the insulation. The device further includes an actuator configured to cause the probe to oscillate and a sensor configured to sense the oscillation of the probe. The device further includes a control system configured to cause the actuator to oscillate the probe. The sensor is configured to generate a signal that represents the density of insulation.

In certain embodiments, the probe takes the form of a metal retractable or non-retractable needle that can be inserted through wallboard or other barriers (e.g., through a pre-pierced hole) to be surrounded by the insulation for which the density is to be determined. The actuator may be, for example, a mechanical actuator or an electromagnetic actuator, e.g., in the form of an electromagnet, multiple electromagnets, a hammer, or multiple hammers that can be excited to cause the probe to oscillate within the insulation. The sensor may, for example, take the form of a coil of wire that is magnetically coupled to at least a portion of the oscillating probe. The control system can be implemented with any combination of software and/or hardware as described herein.

As such, the sensor is configured to generate a signal that represents the displacement and/or velocity of the probe, e.g., relative to a resting state as the probe oscillates. By analyzing the signal to determine how the insulation interacts with the oscillating probe (e.g., how the insulation resists or lessens the oscillation of the probe), and by using known characteristics of the insulation, the control system (or a user) can determine the density of the insulation within the cavity.

For example, the signal generated by the sensor may be used to determine a decay constant representing a degree to which the insulation resists the movement of the probe. The determined decay constant can be used to determine the density of insulation. For instance, the determined decay constant can be compared (e.g., via a subtraction or a division operation) to a decay constant representing the degree to which ambient air and/or characteristics of the device resist oscillation of the probe. Additionally, the device may store data indicating correlations between various determined decay constants and respective densities of insulation. The correlations between decay constant and insulation density will vary based on the type of insulation that is under test. Methods disclosed herein involving the determination of decay constants of insulation are compatible with using an oscillatory driving force to oscillate the probe, and are also compatible with imparting an impulse force to the probe. That is, decay constants can be derived from transitory or steady state probe oscillation signals.

In another embodiment, the signal generated by the sensor may be used to determine a decay time during which a displacement amplitude of the oscillating probe is attenuated by the insulation by a predetermined amount (e.g., in the range of 50% to 75%, 50% to 90%, or 50% to 99%, such as, for example, 50%, 75%, 90% or 99%). The determined decay time can be used to determine the density of insulation. For instance, the determined decay time can be compared (e.g., via a subtraction or a division operation) to a decay time during which the displacement amplitude of the probe attenuates by the predetermined amount when oscillating in ambient air (e.g., not surrounded by insulation). Additionally, the device may store data indicating correlations between various determined decay times and respective densities of insulation. The correlations between decay times and insulation density will vary based on the type of insulation that is under test. Methods disclosed herein involving the determination of decay times for insulation are generally compatible with imparting an impulse force to the probe to oscillate the probe and with using an oscillatory driving force to oscillate the probe. However, an oscillatory driving force applied to the probe must discontinue at some point so that the probe oscillation amplitude has a chance to decay so that a decay time can be determined. That is, decay times can generally only be derived from transient probe oscillation signals.

In yet another embodiment, the device rectifies the signal generated by the sensor and integrates the rectified signal over a predetermined duration after onset of free oscillation of the probe to determine an amount of oscillation energy absorbed by the insulation during the predetermined duration. The amount of oscillation energy absorbed by the insulation is then compared (e.g., via a subtraction or division operation) to an amount of oscillation energy that is absorbed in a reference substance (e.g., any gas, liquid, solid, ambient air, or insulation material) during the predetermined duration when the probe freely oscillates in air. This comparison can yield the density of insulation. Alternatively, the device may store data that correlates various amounts of absorbed energy with respective densities, and this data may be used to determine the density of insulation.

In various embodiments, the signal generated by the sensor is provided for output via an output device such as a display screen, an oscilloscope, a voltmeter, and/or an analog-to-digital converter (A/D converter). For example, the display screen or oscilloscope may display the signal in the form of voltage over time. The voltmeter may display an RMS voltage value that corresponds to the signal. The A/D converter might be used to convert the signal to a digital format that is displayable by a display screen, for example. In other examples, a display screen might display the density of insulation (e.g., $g/cm^2$) automatically determined by the control system.

In certain embodiments, the device may include an input device, such as a touchscreen, a keyboard etc. In such embodiments, the control system can be configured to receive input from the input device representing known characteristics of the insulation (e.g., the composition of the insulation). The control system may use this information in conjunction with analysis of the signal generated by the probe to determine the density of the insulation within the cavity.

Another aspect of the disclosure is another device for determining the density of insulation (e.g, within a cavity). The device includes a probe configured to be inserted into insulation such that the probe contacts the insulation, a base component to which the probe is mechanically coupled, and a sensor configured to generate a signal representing displacement and/or velocity of the probe within the insulation. In this context, the displacement and/or velocity of the probe indicates the density of insulation.

In some embodiments, the device includes a control system (e.g., hardware and/or software) configured to cause displacement of the probe and/or configured to use the generated signal to determine the density of insulation. In this context, using the signal may include digitizing the signal and processing the signal.

In particular embodiments, the probe includes a non-magnetic material. The probe could be coupled to the base component at a first end of the probe such that a second opposing end of the probe is configured to be inserted into the insulation. Or, the probe could be coupled to the base component at a location between first and second opposing ends of the probe. As such, the probe might include a counterweight located at the first end of the probe, such that the second end of the probe is configured to be inserted into the insulation.

In some embodiments, the device includes a protrusion (e.g., retractable or non-retractable needle) that extends from the base component, the protrusion being configured to be inserted into the insulation. Similarly, the probe itself might include one or more retractable or non-retractable needles for insertion into the insulation.

In particular embodiments, the sensor includes a coil of wire that defines a gap. Accordingly, the probe might include a magnetic component (e.g., a permanent magnet) that is configured to move with respect to the gap and the probe could be magnetically coupled to the coil of wire. In this context, the sensor can be configured to generate the signal via sensing movement of the magnetic component with respect to the gap.

In some embodiments, the device includes an actuator configured to displace the probe. For example, the actuator might include an electromagnet, with the control system being configured to provide an excitation current to the electromagnet to displace the probe. In other embodiments, the actuator might include a hammer, with the control system being configured to cause the hammer to strike the probe to displace the probe.

In particular embodiments, the probe is coupled to the base component via a spring. Additionally, a mechanical latch might be configured to restrict movement of the probe. Additionally, the device might include a magnetic component attached to the base component that is configured to repel the probe away from the sensor or attract it towards the sensor.

In some embodiments, the control system is configured to use the generated signal to determine the density of insulation (e.g., based on known characteristics of the insulation). In this context, using the signal may include digitizing the signal and processing the signal. For example, the device can include an input device, with the control system being configured to: receive input, from the input device, representing the known characteristics of the insulation, and use the received input to determine the density of insulation.

In particular embodiments, the device includes an output device, with the control system being configured to cause the output device to provide output characterizing the determined density of insulation and/or the generated signal.

In various embodiments, the output device includes an oscilloscope, a voltmeter, an analog-to-digital converter, and/or a display screen.

In some embodiments, the signal represents displacement and/or velocity of the probe relative to the sensor with respect to time.

Another aspect of the disclosure is a method for determining the density of insulation (e.g., within a cavity), for example, using any of the aforementioned devices. The method includes placing a probe into contact with the insulation (e.g., fibrous insulation material), displacing the probe in a first direction such that potential energy is stored, releasing the probe such that the probe (a) moves in a second direction to reach a point of maximum displacement in the second direction, the second direction being opposite the first direction, and/or (b) moves back in the first direction after reaching the point of maximum displacement, and generating, via a sensor, a signal that indicates the point of maximum displacement.

In preferred embodiments, displacing the probe in the first direction can include displacing the probe in the first direction prior to placing the probe into contact with the insulation.

In particular embodiments, the probe includes a non-magnetic material and/or one or more retractable or non-retractable needles.

In some embodiments, the sensor includes a coil of wire that defines a gap. In this context, the probe might include a magnetic component (e.g., a permanent magnet) that is configured to move with respect to the gap and is magnetically coupled to the coil of wire. As such, generating the signal might include generating the signal via movement of the magnetic component with respect to the gap.

In particular embodiments, placing the probe into contact with the insulation includes placing the probe such that at least an end of the probe is surrounded by the insulation.

In some embodiments, displacing the probe in the first direction includes displacing the probe with an electromagnet. In this context, releasing the probe might include shutting off the electromagnet, decreasing the power provided to the electromagnet, or reversing the polarity of the electromagnet by reversing the direction of current flow through the coil of the electromagnet.

In other embodiments, displacing the probe in the first direction includes manually displacing the probe. The potential energy can be stored by holding the probe with a mechanical latch. In some embodiments, the probe moves in the second direction at least in part due to a magnetic component of the device repelling the probe.

In particular embodiments, the method also includes inserting a protrusion (e.g., a retractable or non-retractable needle) into the insulation (at any angle) to stabilize the device, with the protrusion being coupled to the probe via a base component.

In some embodiments, the method includes using the generated signal to determine the density of insulation (e.g., based on known characteristics of the insulation). For example, the method might include receiving input, from an input device, representing the known characteristics of the insulation, and using the received input to determine the density of insulation.

In particular embodiments, the method includes providing, via an output device, output characterizing the determined density of insulation and/or the generated signal. The output device can include an oscilloscope, a voltmeter, an analog-to-digital converter, and/or a display screen.

In some embodiments, the signal represents displacement and/or velocity of the probe relative to the sensor with respect to time.

Any of the devices described herein can be stabilized against a floor with an external stand (e.g., tripod) to minimize movement of the device while in use. Additionally or alternatively, any of the devices described herein can include additional structural members that can be used to stabilize or brace the device against the frame of a cavity (e.g., wall studs) to minimize movement of the device while in use.

Referring now to the drawings, FIG. 1A is a schematic view of a device 100 for determining the density of insulation 102 (e.g., fibrous insulation material) in a cavity 104, according to one embodiment of the disclosure. The cavity 104 may take the form of a space between wood studs of a wall. In this case, the insulation 102 may be exposed or may be concealed behind a wallboard. In another example, the cavity 104 is concealed behind a sheet (e.g., of netting, paper, or fabric) that is attached to a roof deck, thereby defining the cavity 104. Other examples are possible.

The device 100 includes a probe 106 configured to be inserted (e.g., via protrusion 110a) into the cavity 104 containing the insulation 102 such that the probe 106 contacts and/or is surrounded by the insulation 102. (See FIG. 1B.) The device 100 also includes an actuator 108 configured to cause the probe 106 to oscillate, and a sensor 110 configured to sense the oscillation of the probe 106. The device 100 further includes a control system 112 configured to cause the actuator 108 to oscillate the probe 106. The sensor 110 is configured to generate a signal 119 that represents the density of the insulation 102 in the cavity 104. In another sense, the signal 119 represents a displacement and/or a velocity of the probe 106 relative to the sensor 110.

In some embodiments, the sensor 110 and the actuator 108 could be implemented as a single electromagnetic device.

The probe 106 may take the form of a metal or plastic bar that is coupled to a base component 114 at an end 117 of the probe 106. The probe 106 is configured to oscillate at an opposite end 121. The end 121 of the probe 106 may include a protrusion 110a. In some examples, the protrusion 110a includes one or more retractable or non-retractable needles. The probe 106 may include at least a portion that includes a magnetic material and/or a magnetic component 109 (e.g., a permanent magnet) that is attached to the probe 106 proximate to the sensor 110. The probe 106 may also include another magnetic (e.g., ferromagnetic) component 111 proximate to the actuator component 108.

The device 100 can also include non-magnetic (e.g., plastic) stops 21 and 22 placed between the top and bottom portions of the actuator 108. The plastic stops 21 and 22 can help prevent the probe 106 from making contact with the actuator 108. The plastic stops 21 and 22 can be placed anywhere on the device 100 to help prevent the probe 106 from making contact with the actuator 108

In one example, the actuator takes the form of one or more electromagnets, e.g., a coil of wire that surrounds a magnetic core. As shown in FIG. 1A, the actuator 108 includes electromagnets (e.g., horseshoe magnets) on opposing sides of the probe 106. In this example, the control system 112 includes a power supply configured to provide excitation current(s) 123 to the actuator 108 to cause oscillation of the probe 106. In this example, the probe 106 includes a magnetic portion 111 so that a magnetic field generated by the actuator 108 can impart a locomotive force to the probe 106. In another example, an actuator takes the form of a hammer that the control system 112 may operate to strike the probe and cause oscillation of the probe. The actuator may take the form of any mechanical or electromagnetic apparatus that is configured to cause the actuator to oscillate the probe.

The sensor 110 takes the form of a coil of wire that defines a gap 120. In this example, the control system 112 is configured to receive the signal 119 generated by the sensor 110 sensing movement of the magnetic component 109 through the gap 120.

The control system 112 may be implemented via any combination of hardware and/or software to implement the functionality described herein. For example, the control system 112 may include one or more processors (e.g., general purpose processors, digital signal processors, special purpose processors) and a memory (e.g., volatile, nonvolatile, removable, non-removable, magnetic, optical, or flash storage) storing instructions that, when executed by the one or more processors, cause the device 100 to perform any of the functions described herein. In another example, the control system 112, may include special purpose hardware that is hard-wired to perform the functions described herein. Other examples are possible. Additionally, the control system 112 may include a discrete low pass filter as described further herein.

The user interface 124 enables interaction between a user (if applicable) and the device 100. As such, the user interface 124 may include input devices such as a keyboard, a keypad, a mouse, a touch-sensitive panel, a microphone, push buttons, and/or a camera. The user interface 124 may also include output devices such as a display screen (which, for example, may be combined with a touch-sensitive panel), an audio speaker, a haptic feedback system, a voltmeter, an analog-to-digital converter, and/or an oscilloscope. The user interface 124 is connected to the control system 112 via connection 125, which may be a wired or wireless connection.

Figure 1B:
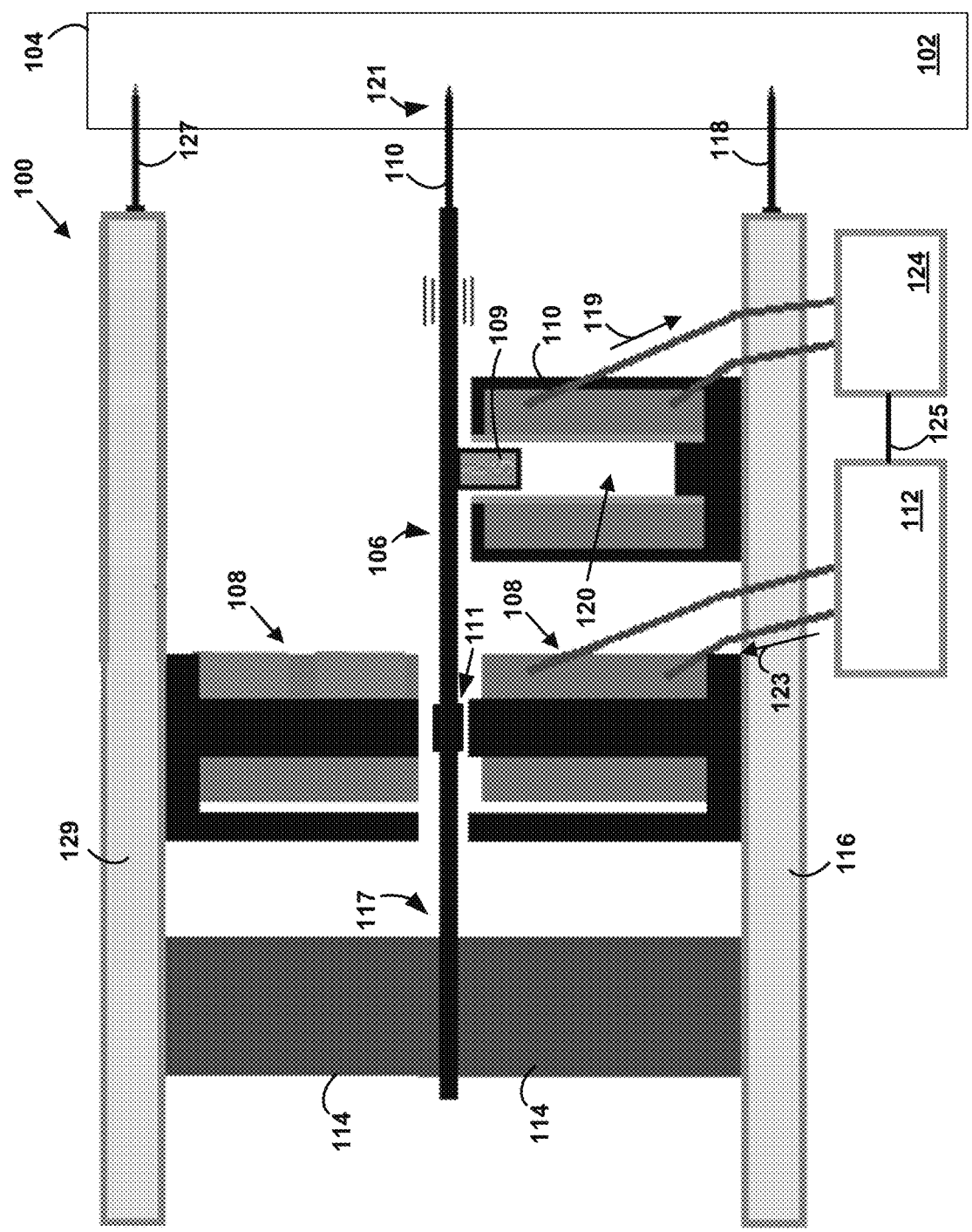
FIG. 1B is a schematic view of the device of FIG. 1A with a probe of the device inserted into the cavity to determine the density of the insulation.

The device 100 may include an additional base component 116 that is coupled to the base component 114, the actuator 108, and the sensor 110, as shown in FIGS. 1A and 1B. The base component 116 may include a retractable or non-retractable protrusion 118 that extends from the base component 116. As shown in FIG. 1B, the protrusion 118 (e.g., a retractable or non-retractable needle) may be used to establish a positional reference point in the insulation 102 for the actuator 108 and sensor 110 and to stabilize the device 100 during operation via inserting the protrusion 118 through the barrier (if present) and into the insulation 102.

The device 100 may include yet another base component 129 that is coupled to the base component 114 and the actuator 108, as shown in FIGS. 1A and 1B. The base component 129 may include a protrusion 127 that extends from the base component 129. As shown in FIG. 1B, the protrusion 127 (e.g., a retractable or non-retractable needle) may be used to establish a second positional reference point in the insulation 102 for the actuator 108 and sensor 110 and to stabilize the device 100 during operation via inserting the protrusion 127 through the barrier (if present) and into the insulation 102.

In some embodiments, one or more of the protrusion 127, the end 121, or the protrusion 118 are accompanied with respective (e.g., plastic) caps or sleeves that cover their sharp tips when not in use to protect users and/or the tips.

In some embodiments, the protrusions 127 and 118 may be part of a larger set of protrusions that encircle the probe 106.

Figure 2A:
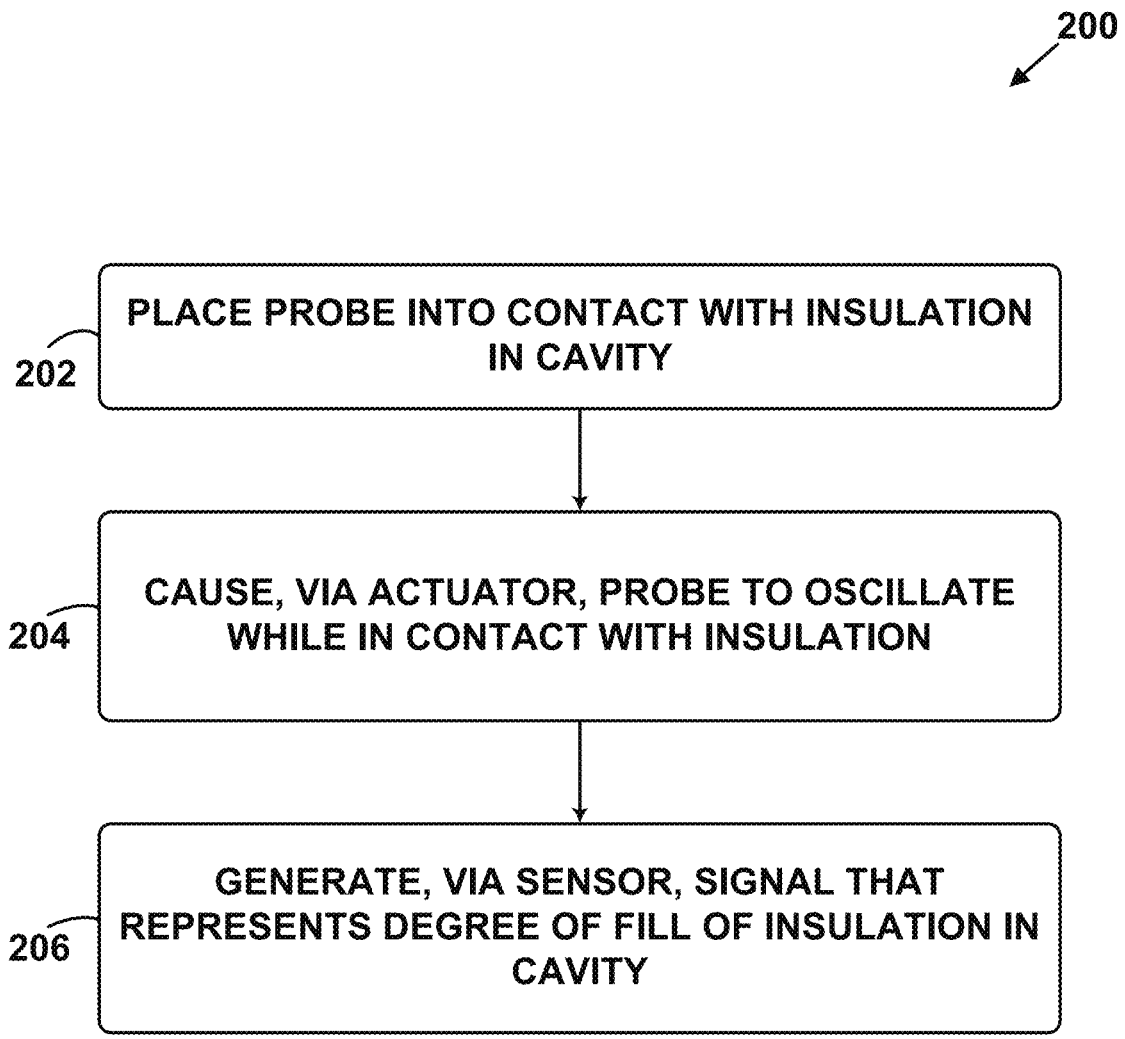
FIG. 2A is a block diagram of a method for determining the density of insulation in a cavity according to one embodiment of the disclosure.

FIG. 2A is a block diagram of a method 200 for determining the density of insulation in a cavity according to one embodiment of the disclosure.

At block 202, the method 200 includes placing a probe into contact with the insulation in the cavity. For example, as illustrated in FIG. 1B, the probe 106 is placed into contact with the insulation 102 within the cavity 104. The probe 106 can be inserted into the insulation at any angle with respect to a wall, an insulation cavity, or a floor. This may involve the protrusion 110a being inserted through a pierced hole in a barrier (e.g., a fabric) in front of the insulation 102 or may simply involve inserting the probe 106 directly into the exposed insulation 102. In some embodiments, the probe 106 includes a sharp cutting surface that can be used to cut a hole in a (e.g., paper or fabric) barrier that encloses a cavity such that the hole in the barrier allows freedom of movement for the probe 106. In preferred embodiments, the end 121 of the probe 106 is placed into contact with the insulation 102 such that the end 121 of the probe 106 is surrounded by the insulation 102. The protrusion 118 may be inserted into the insulation 102 and/or through the barrier as well to stabilize the device 100 or establish a positional reference for the probe 106 during operation.

At block 204, the method 200 includes causing, via an actuator, the probe to oscillate while in contact with the insulation. Depending on the form of the actuator, the control system 112 may cause the actuator to oscillate the probe in a number of ways. For example, the actuator 108 may take the form of one or more electromagnets, and the control system 112 provides an excitation current 123 to the actuator 108 to oscillate the probe 106. In another example, the actuator may take the form of one or more hammers, and the control system 112 may, via an arm or similar means, mechanically force the hammer(s) to strike the probe 106, causing the probe 106 to oscillate.

As such, excitation of the probe 106 via the actuator 108 may take different forms. For instance, the actuator 108 may impart an oscillatory (e.g., sinusoidal) driving force to the probe 106 in response to receiving an oscillatory (e.g., sinusoidal) excitation current 123 from the control system 112. In some examples, the probe 106 is oscillated in this way until the oscillation of the probe 106 reaches a substantially steady state amplitude within the insulation 102. In other examples, the excitation current 123 may be an impulse current that causes the actuator 108 to impart a transitory impulse force to the probe 106.

In some embodiments, the actuator includes a first electromagnet that is positioned on a first side of the probe and a second electromagnet that is positioned on a second opposing side of the probe. In this context, causing the probe to oscillate via the actuator while in contact with the insulation may include alternatingly: repelling or attracting, via the first electromagnet, the probe toward the second electromagnet, and repelling or attracting, via the second electromagnet, the probe toward the first electromagnet.

In certain embodiments, the probe includes a magnetic component positioned between the first electromagnet and the second electromagnet. In this context, repelling or attracting the probe via the first electromagnet toward the second electromagnet may include repelling or attracting the magnetic component and repelling or attracting the probe via the second electromagnet toward the first electromagnet may include repelling or attracting the magnetic component.

In additional embodiments, repelling or attracting the probe via the first electromagnet toward the second electromagnet may include exciting the first electromagnet with a DC-pulsed current, and repelling or attracting the probe via the second electromagnet toward the first electromagnet may include exciting the second electromagnet with a DC-pulsed current.

Referring to FIG. 1B for example, the first electromagnet of the actuator 108 that is below the probe 106 may repel the probe 106 away (e.g., up) from the first electromagnet toward the second electromagnet that is above the probe 106. While the probe 106 is reaching (or after the probe 106 has reached) an oscillatory position near the second electromagnet, the second electromagnet may begin repelling the probe 106 away (e.g., down) from the second electromagnet toward the first electromagnet. More specifically, the first and second electromagnets may primarily repel the magnetic protrusion 111 and thus the probe 106 as a whole.

Alternatively, the first electromagnet of the actuator 108 that is below the probe 106 may attract the probe 106 toward the first electromagnet. While the probe 106 is reaching (or after the probe 106 has reached) an oscillatory position near the first electromagnet, the second electromagnet may begin attracting the probe 106 toward the second electromagnet.

The first and second electromagnets may receive respective first and second DC-pulsed currents that are out of phase, or sinusoidal waveforms that are out of phase to exert a push-pull force on the probe, or may receive half-wave rectified sinusoidal waveforms that are out of phase to exert a push-only or pull-only force on the probe to perform these functions.

At block 206, the method 200 includes generating, via a sensor, a signal that represents the density of insulation in the cavity. For example, the sensor 110 senses the oscillation of the probe 106 and, in response, generates the signal 119. More specifically, the movement of the magnetic component 109 through the gap 120 causes the signal 119 to be generated. Accordingly, the signal 119 represents displacement and/or velocity of the probe 106 relative to the sensor 110 with respect to time.

The control system 112 (or a user) may use the signal 119 in conjunction with known characteristics (e.g., composition) of the insulation 102 to determine the density of insulation 102 in the cavity 104. For example, the user interface 124 may receive, via an input device, input representing known characteristics of the insulation 102. As such, the control system 112 may use the known characteristics represented by the received input and the signal 119 to determine the density of the insulation 102 as described further below.

More specifically, the control system 112 (or a user) may use the signal 119 to determine a decay constant representing a degree to which the insulation 102 resists oscillation of the probe 106, and use the determined decay constant to determine the density of insulation 102 in the cavity 104. To this end, the determined decay constant may be compared to a (reference) decay constant representing a degree to which ambient air and/or characteristics of the probe 106 resist oscillation of the probe 106. In other examples, the determined decay constant may be "looked up" in a data table that maps the determined decay constant to a density of the insulation 102 based on the composition of the insulation 102.

Additionally or alternatively, the control system 112 (or a user) may use the signal 119 to determine a decay time during which a displacement amplitude of the probe 106 is attenuated by the insulation 102 by a predetermined amount after imparting an impulse force to the probe 106 via the actuator 108. The control system 112 may then use the determined decay time to determine the density of insulation 102 in the cavity 104 as described further below.

More specifically, the control system 112 may use the determined decay time to determine the density of insulation 102 in the cavity 104 by comparing the determined decay time to a second decay time during which the displacement amplitude of the probe 106 attenuates by the predetermined amount when oscillating in air. To this end, the determined decay time may be compared to the second decay time via subtracting the determined decay time from the second decay time. In other examples, the determined decay time may be "looked up" in a data table that maps the determined decay time to a density of the insulation 102 based on the composition of the insulation 102.

Figure 2B:
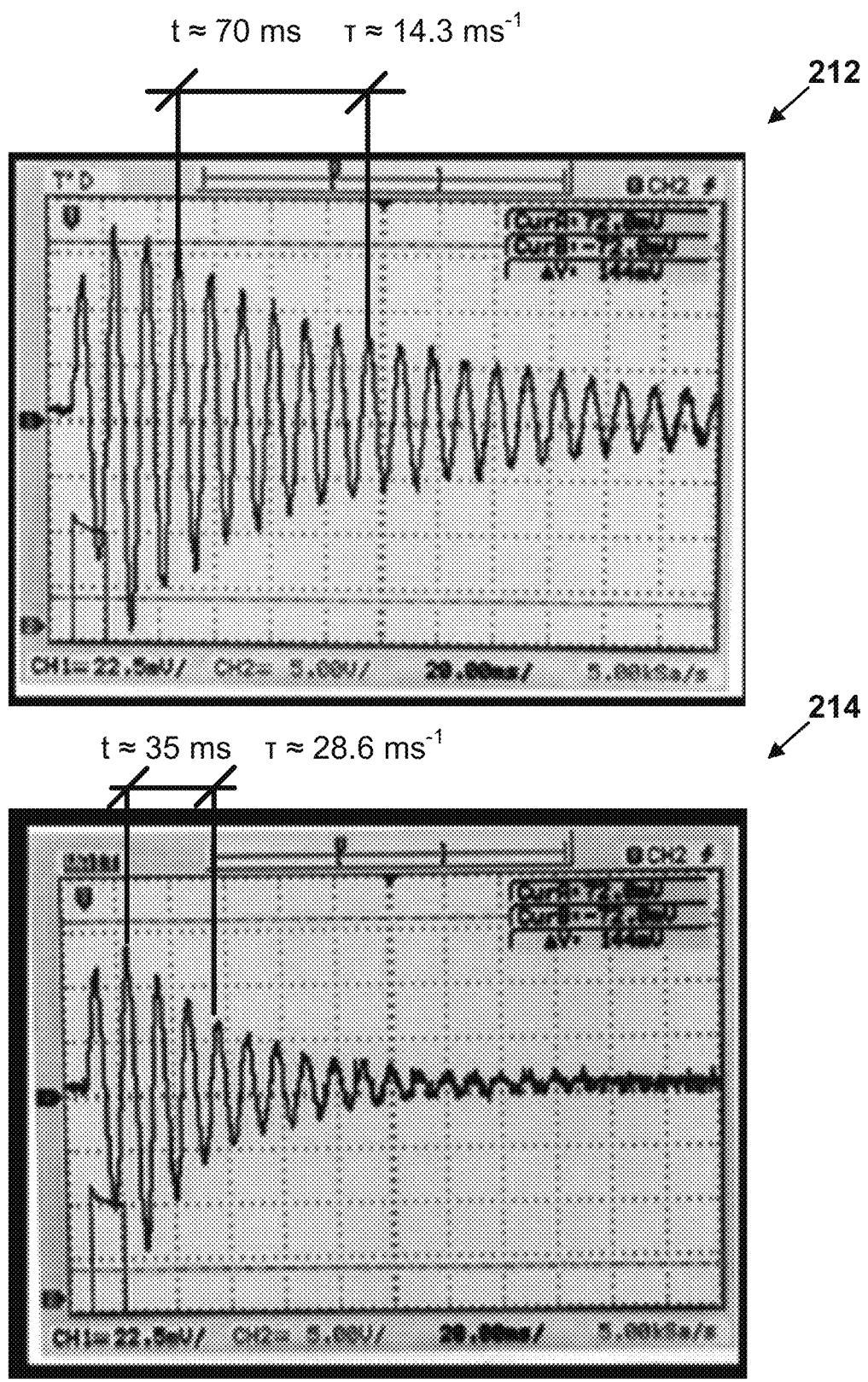
FIG. 2B includes experimental data obtained by using a device similar to that of FIG. 1.

Referring to FIG. 2B for instance, two different signals 119 are depicted respectively by the waveform 212 and the waveform 214. The waveform 212 depicts a signal 119 representing oscillation of the probe 106 in ambient air, that is, while the probe 106 is not inserted into the insulation 102. The waveform 214 depicts a signal 119 representing oscillation of the probe 106 while the probe 106 is inserted into insulation 102 having an unknown density. Hereinafter, decay time may refer to the time that passes while the signal 119 exhibits a 50% decline in amplitude, and decay constant may refer to the reciprocal of that decay time.

As such, the waveform 212 shows a signal 119 that exhibits an approximate 50% attenuation in amplitude over about 70 ms. Therefore, the decay time for waveform 212 is about 70 ms and the decay constant is about 14.3 ms$^{-1}$. The waveform 214 shows a signal 119 that exhibits an approximate 50% attenuation in amplitude over about 35 ms. Therefore, the decay time for waveform 214 is about 35 ms and the decay constant is about 28.6 ms$^{-1}$. The decay time of 35 ms or the decay constant of 28.6 ms$^{-1}$ can be "looked up" in an appropriate data table to yield the density for the insulation 102, as represented by the waveform 214.

In various examples, it may be useful to perform various signal processing operations upon the signal 119 for more reliable results. For example, in determining the density of the insulation 102, the control system 112 may be configured to perform any of the following operations upon the signal 119: a low pass filter operation, digital sampling, discrete data filtering, a square root operation, a sum operation, a multiplicative scaling operation, or a rectification operation.

In a particular embodiment, the control system 112 or a discrete low pass filter included therein may be configured to remove high frequency components from the signal 119, such as artifacts that reflect the impact force of the actuator 108. Next, the signal 119 may be sampled 20,000 times over a 1 second interval, that is, at a 20 kHz sampling rate. In other examples, the sampling rate might vary from 15-25 kHz. The signal 119 may then be rectified, i.e., any negative displacement values of the signal 119 are multiplied by −1. Additionally, data points of the signal 119 whose absolute value is greater than a particular amplitude may be deleted from the signal 119 and disregarded. Next, a square root operation may be performed on the signal 119 to emphasize purely oscillatory portions of the signal 119 as compared to portions of the signal 119 that reflect any impulse provided by the actuator 108. Lastly, the displacement, velocity, or voltage values of the signal 119 may be summed and/or multiplicatively scaled, which serves as an integration of the signal 119 over a predetermined duration. The result of the integration reflects how much energy was sustained as oscillation of the probe 106 as opposed to friction generated within the insulation 102 over the predetermined duration. The energy that is sustained as oscillation of the probe 106 can be compared to a reference amount of energy that represents the amount of energy that is sustained by the probe 106 over the predetermined duration when the probe is oscillating in ambient air. Alternatively, the amount of energy determined from the integration can be "looked up" in a data table that maps the determined amount of energy to a density of insulation 102.

Once data is obtained in the form of a determined density of the insulation 102 (e.g., g/cm$^3$), the data can be displayed in numeric form on a display screen of the user interface 124. Alternatively, the signal 119 can be provided directly in the form of output to possible output devices of the user interface 124 such as an oscilloscope, a voltmeter, or an analog-to-digital converter.

It will be appreciated by one of skill in the art that a variety of devices can receive the output, and that the output could also be transmitted by non-direct means, such as to a smart phone, computer or tablet device by wireless means. Such means could include Bluetooth or WiFi or radio frequency transmission to devices capable of receiving such signals.

The ability of such signals to be analyzed by devices that prospective users might already own (such as a cell phone, smart phone, tablet or computer) could mean that the cost of a measurement device could be considerably less expensive than if the output device was integrated into the measurement device directly. Likewise, providing the display or data analysis in an external device can reduce the weight and size of the measurement device, improving its usability and durability in the field.

In one particular embodiment, the probe 106 may be excited with impact forces that are perpendicular to each other. For example, an additional actuator may be configured to apply a force to the probe 106 that causes the probe 106 to oscillate in the x-y plane, whereas the force applied to the probe 106 by the actuator 108 may cause the probe 106 to oscillate in the x-z plane. Accordingly, an additional sensor may be configured to sense oscillation of the probe 106 in the x-y plane, whereas the sensor 110 senses oscillation of the probe 106 in the x-z plane.

As such, an additional example method includes causing, via the second actuator, the probe 106 to oscillate within the x-y plane. The method further includes sensing, via the second sensor, oscillation of the probe 106 within the x-y plane, and generating, via the second sensor, a signal that represents displacement and/or velocity of the probe 106 within the x-y plane with respect to time.

Figure 3:
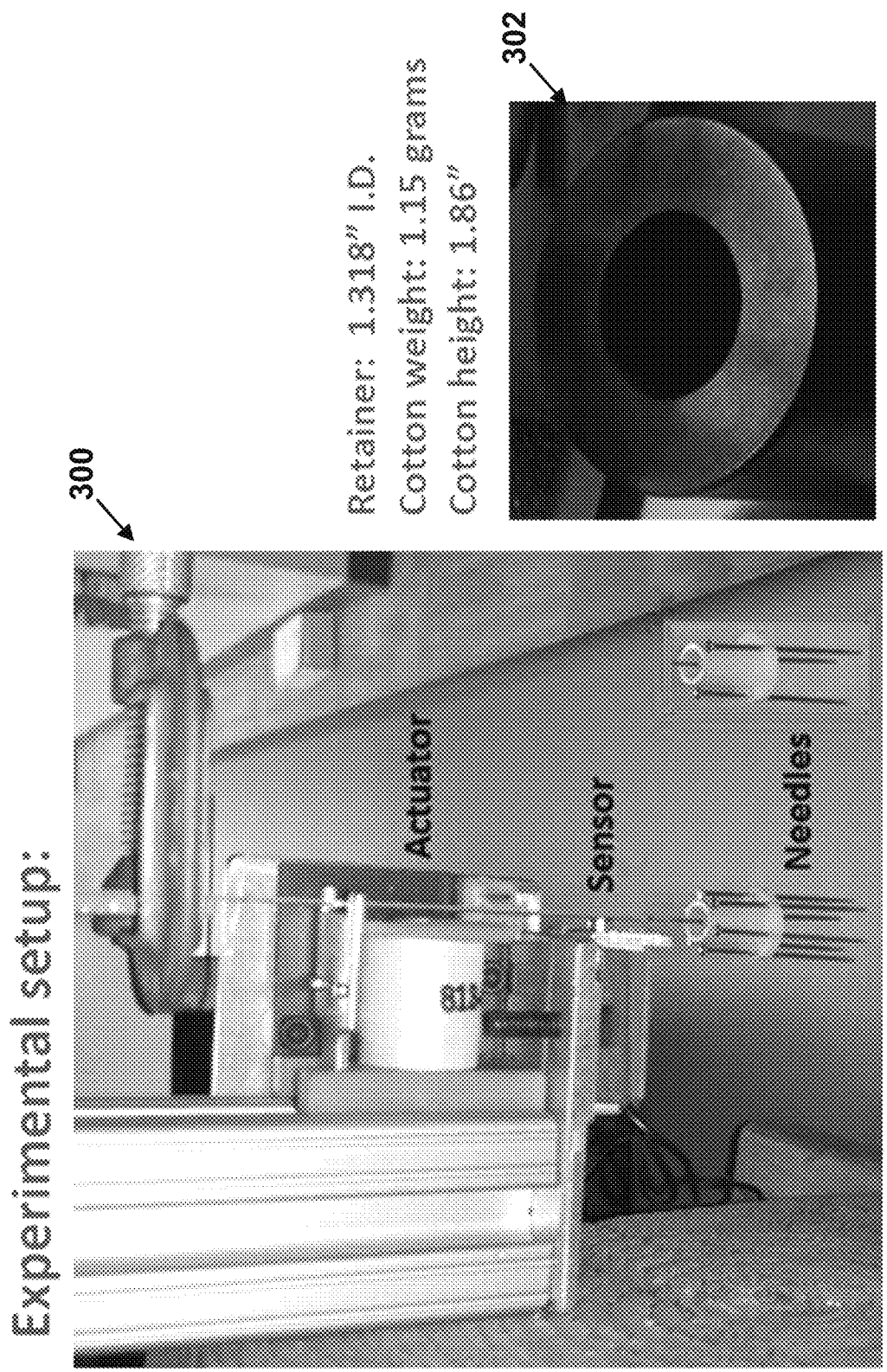
FIG. 3 includes a photograph of an experimental device similar to the device of FIGS. 1A and 1B and a photograph of a text fixture.

FIG. 3 includes a photograph of an experimental device 300 similar to the device 100 of FIGS. 1A and 1B and a photograph of a text fixture 302.

Figure 4:
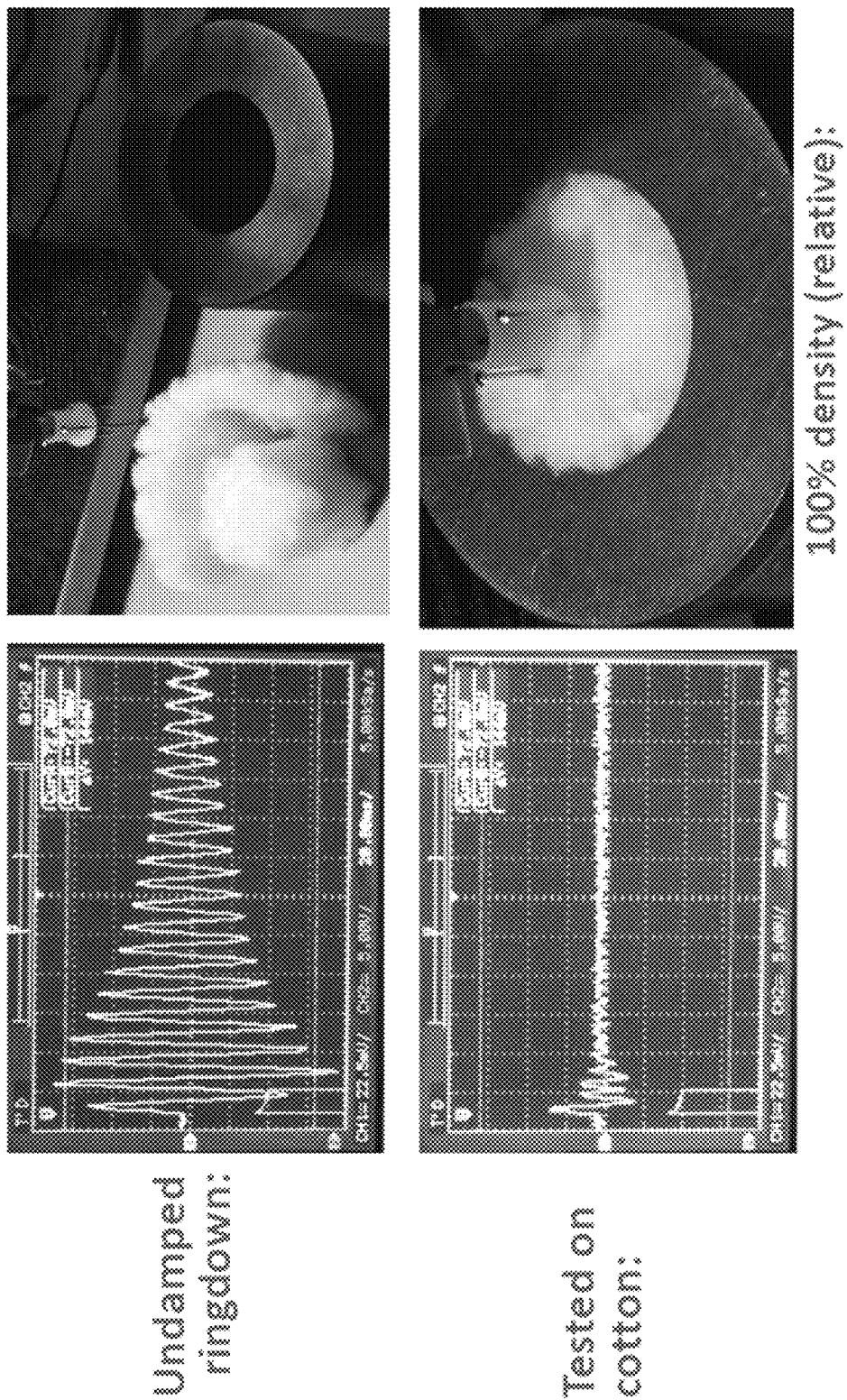
FIG. 4 depicts experimental data obtained by oscillating the probe of the device of FIG. 3 within material held within the test fixture of FIG. 3.

FIG. 4 depicts experimental data obtained by oscillating the probe of the device of FIG. 3 within material (cotton) held within the text fixture of FIG. 3. As shown in FIG. 4, the waveform labeled "undamped ringdown" exhibits a smaller decay constant that that shown by the waveform labeled "tested on cotton."

Figure 5:
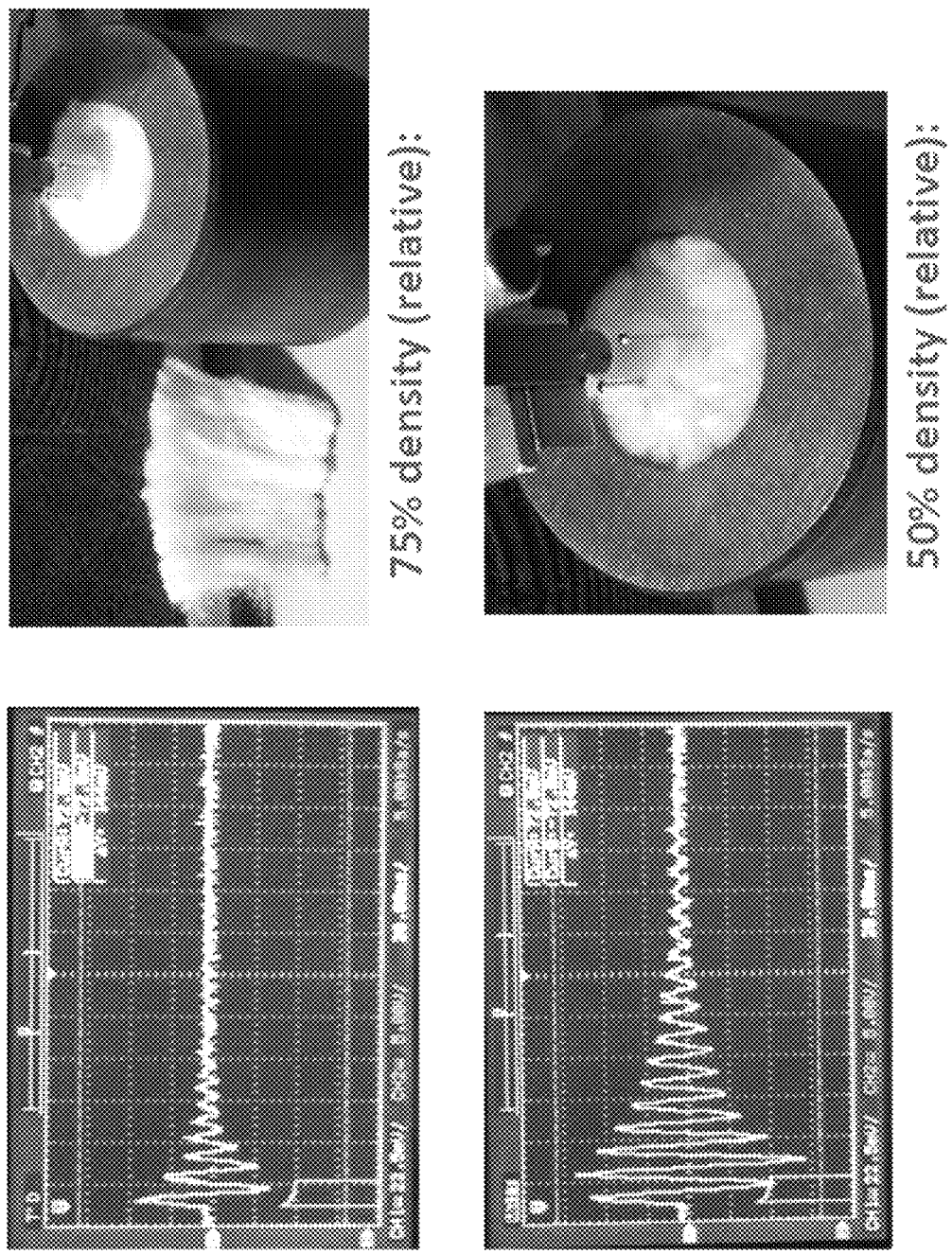
FIG. 5 depicts additional experimental data obtained by oscillating the probe of the device of FIG. 3 within material held within the text fixture of FIG. 3.

FIG. 5 depicts additional experimental data obtained by oscillating the probe of the device of FIG. 3 within material held within the text fixture of FIG. 3. More specifically, FIG. 5 depicts a first waveform in the upper left corner and a second waveform in the bottom left corner. As shown, increased density of insulation material results in an increased decay constant.

Figure 6:
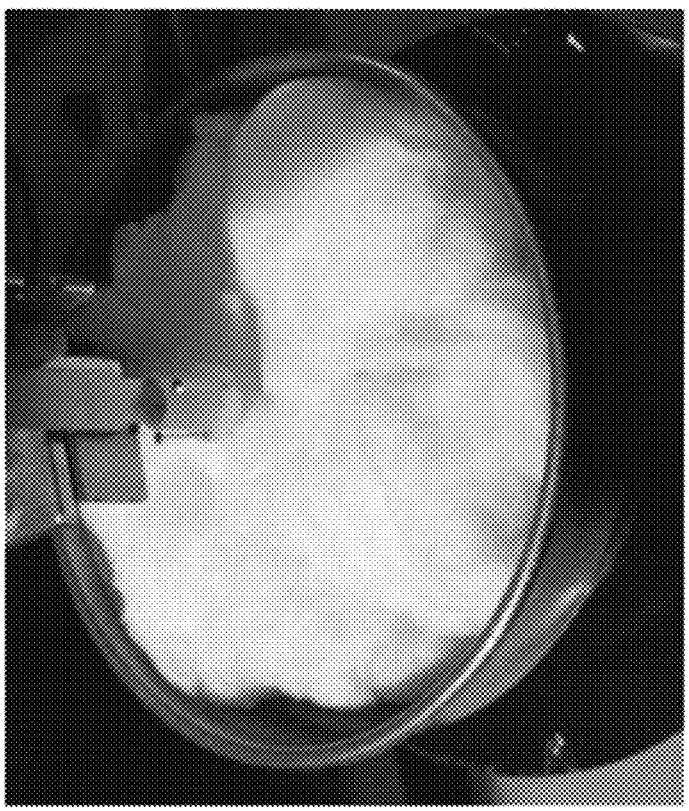
FIG. 6 depicts additional experimental data obtained by oscillating the probe of the device of FIG. 3 within material held within a text fixture.
Figure 6:
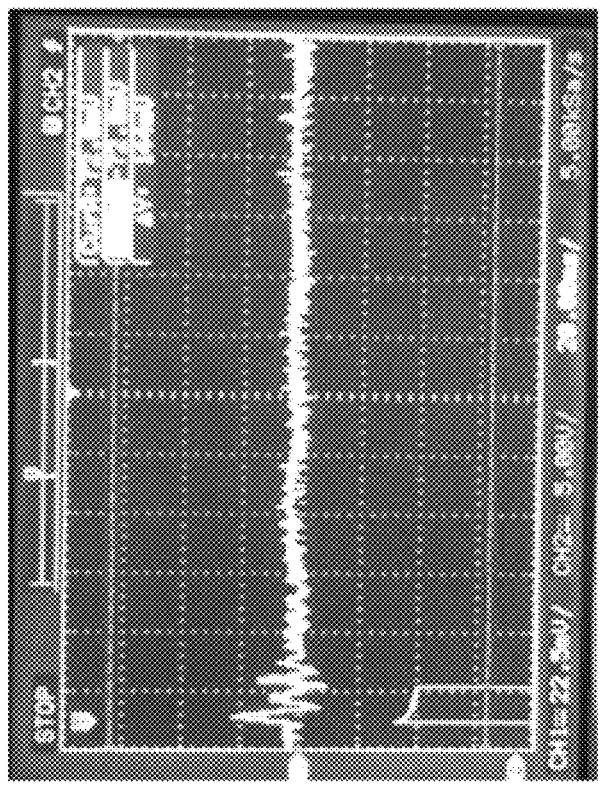

FIG. 6 depicts additional experimental data obtained by oscillating the probe of the device of FIG. 3 within material held within a text fixture. The waveform of FIG. 6 exhibits a very high decay constant which correlates with a high density of insulation material.

Figure 7:
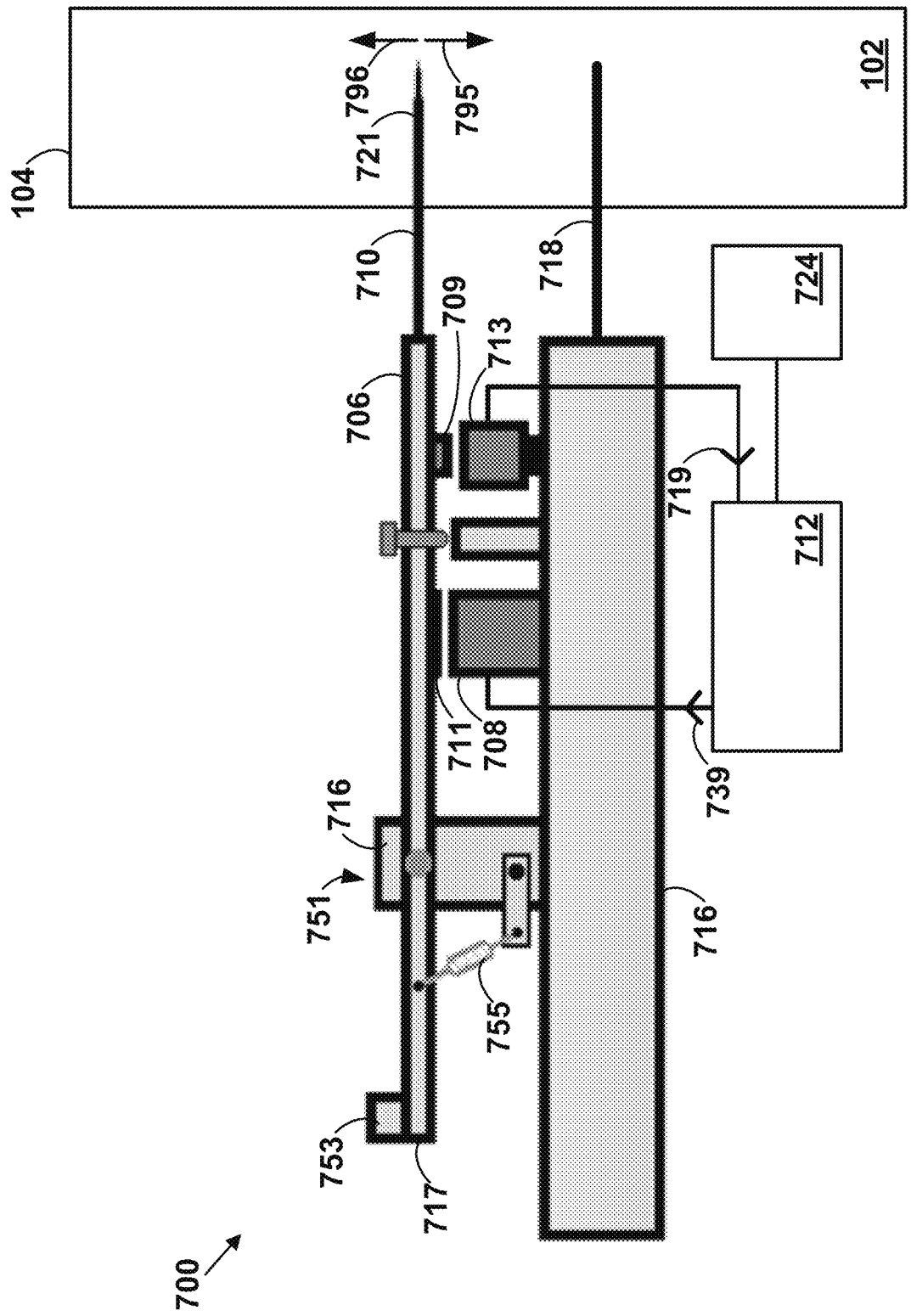
FIG. 7 is a schematic view of a device for determining the density of insulation according to one embodiment of the disclosure.

FIG. 7 is a schematic diagram of a device 700 for determining the density of the insulation 102. The device 700 includes a probe 706 configured to be inserted into the insulation 102 such that the probe 706 (e.g., the protrusion 710 of the probe 706) contacts the insulation 102. The device 700 further includes a base component 716 to which the probe 706 is mechanically coupled, and a sensor 713 configured to generate a signal 719 representing displacement and/or velocity of the probe 706 (e.g. displacement and/or velocity of the protrusion 710) within the insulation 102. In this context, the displacement and/or velocity of the probe 706 represented by the signal 719 indicates the density of the insulation 102.

The device 700 also includes a control system 712 that is configured to cause displacement (e.g., movement or oscillation) of the probe 706 within the insulation 102 and/or configured to use the generated signal 719 to determine the density of the insulation 102 (e.g., based on known characteristics of the insulation 102). In this context, using the signal may include digitizing the signal and processing the signal. The control system can have any of the components, characteristics, or functionality of the control system 112 described above.

The probe 706 can include (e.g., be composed of) a magnetic material and can be coupled to the base component 716 (e.g., via a rotatable shaft) at a location 751 between the first end 717 and the second opposing end 721 of the probe 706. The probe 706 further includes a counterweight 753 located at the first end 717 of the probe 706. The second end 721 of the probe 706 is configured to be inserted into the insulation 102, as shown. The probe 706 includes the protrusion 710 (e.g., a retractable or non-retractable needle). The probe 706 is coupled to the base component 716 via a spring 755. The probe 706 can have any of the components, characteristics, or functionality of the probe 106 described above.

The base component 716 includes a protrusion 718 (e.g., a retractable or non-retractable needle) that extends from the base component 716, with the protrusion 718 being configured to be inserted into the insulation 102. The protrusion 718 might be used to stabilize the device 700 and/or establish a positional reference for the device 700 during use (e.g., while the end 721 is inserted into the insulation 102). The protrusion 718 can have any of the components, characteristics, or functionality of the protrusion 110a described above.

The sensor 713 includes a coil of wire that defines a gap. The probe 706 includes a magnetic component 709 (e.g., a permanent magnet) that is configured to move (e.g., along with the displacement of the probe 706 within the insulation 102) with respect to the gap and is magnetically coupled to the coil of wire. The sensor 713 is configured to generate the signal 719 via sensing movement of the magnetic component 709 with respect to the gap (e.g., with respect to the sensor 713). The sensor 713 can have any of the components, characteristics, or functionality of the sensor 110 described above. In some embodiments, the sensor 713 and the actuator 708 could be implemented as a single electromagnetic device.

The device 700 also includes an actuator 708 configured to displace the probe 706. The actuator 708 can take the form of an electromagnet, with the control system 712 being configured to provide an excitation current 739 to the electromagnet to displace the probe 706. In other embodiments, the actuator takes the form of a hammer, with the control system 712 being configured to cause the hammer to strike the probe 706 to displace the probe 706. The actuator 708 can have any of the components, characteristics, or functionality of the actuator 108 described above.

In some embodiments, the device 700 includes a mechanical latch configured to restrict movement of the probe 706 (e.g., while the device 700 is not in use).

The control system 712 is configured to use the generated signal 719 to determine the density of the insulation 102 (e.g., based on known characteristics of the insulation 102). In this context, using the signal may include digitizing the signal and processing the signal. For example, the device 700 can determine the density of the insulation 102 by way of the input device 724, which can have any of the components, characteristics, or functionality of the input device 124. The control system 712 is configured to: receive input, from the input device 724, representing the known characteristics of the insulation 102, and use the received input to determine the density of the insulation 102.

In various embodiments, the signal 719 generated by the sensor 713 is provided for output via an output device such as a display screen, an oscilloscope, a voltmeter, and/or an analog-to-digital converter (A/D converter). For example, the display screen or oscilloscope may display the signal in the form of voltage with respect to time or probe displacement and/or velocity with respect to time. The voltmeter may display an RMS voltage value that corresponds to the signal. The A/D converter might be used to convert the signal to a digital format that is displayable by a display screen, for example. In other examples, a display screen might display the density of insulation (e.g., g/cm$^2$) automatically determined by the control system 712.

The device 700 includes an adjustable stop 31 that can prevent the probe 706 from contacting the actuator 708 or the sensor 713.

In any of the devices disclosed herein, one or more sensors can be configured to indicate when the probe makes contact with adjustable stops, so that any related measurement can be ignored.

Figure 8:
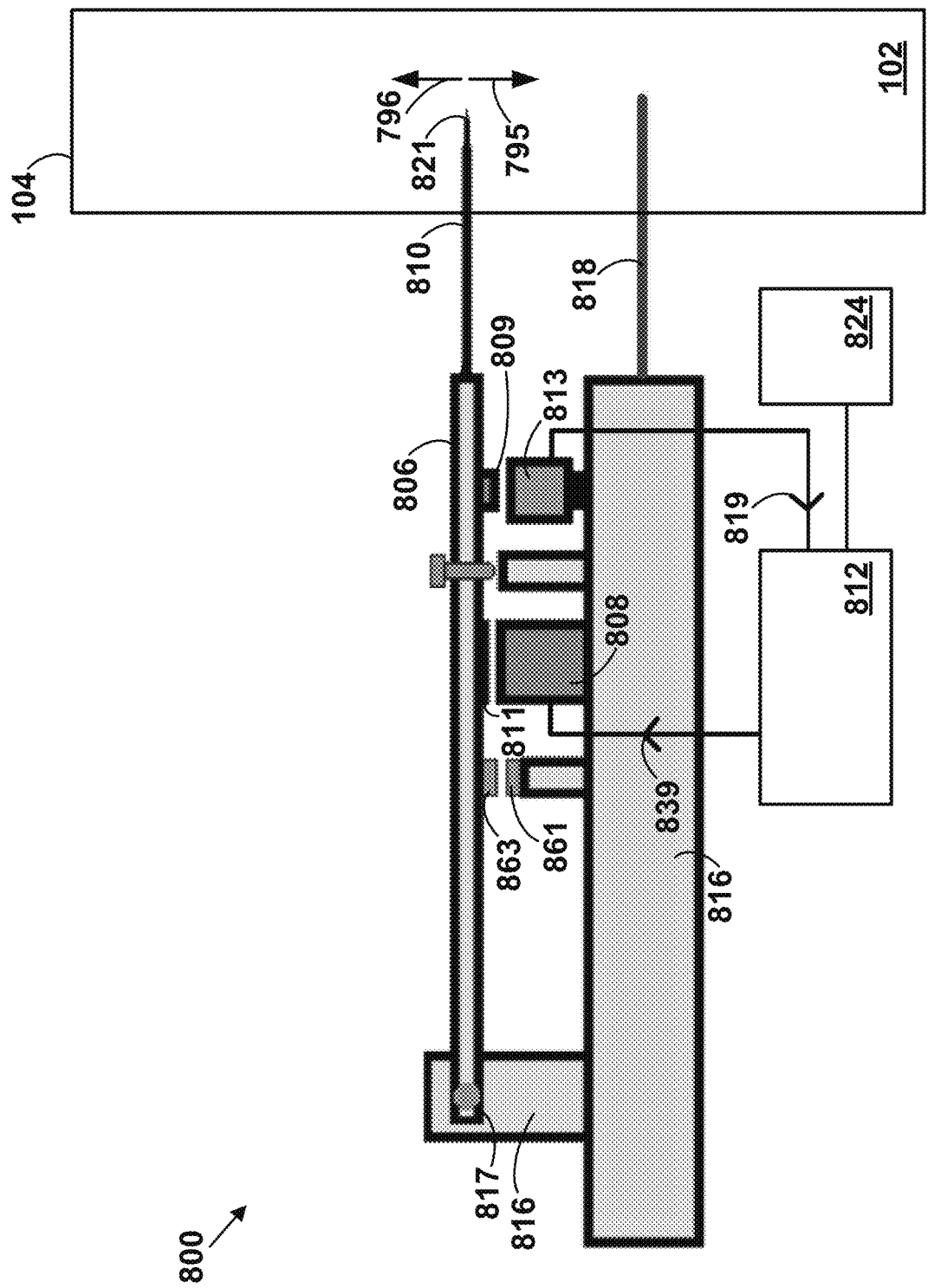
FIG. 8 is a schematic view of a device for determining the density of insulation according to one embodiment of the disclosure.

FIG. 8 is a schematic diagram of a device 800 for determining the density of the insulation 102. The device 800 is generally similar to the device 700 with a notable difference being how the probe 806 is mechanically coupled to the base component 816 when compared to the probe 706 and the base component 716. For example, the end 817 of the probe 806 may be embedded within the base component 816 or may be coupled to the base component 816 via a rod that allows the probe 806 to freely pivot. As shown in FIG. 8, the probe 806 is coupled to the base component 816 at a first end 817 of the probe 806 such that a second opposing end 821 of the probe 806 is configured to be inserted into and move within the insulation 102.

The device 800 also includes a magnetic component 861 that is attached to the base component 816. The magnetic component 861 (e.g., a permanent magnet) is configured to repel the probe 806 by repelling the magnetic component 863 (e.g., a permanent magnet of the same polarity) away from the magnetic component 861. For example, when the actuator 808 is disabled and no longer attracts the probe 806, the probe 806 (e.g., the end 821) might freely move away from the magnetic component 861.

Otherwise, the components 806, 808, 809, 810, 811, 812, 813, 816, 817, 818, 819, 821, 824, 839, 861, and 863 can have any of the components, characteristics, or functionality of the respective components 706, 708, 709, 710, 711, 712, 713, 716, 717, 718, 719, 721, 724, 739, 761, and 763.

In some embodiments, one or more of the end 721, the protrusion 718, the protrusion 810, or the protrusion 818 are accompanied by respective (e.g., plastic) caps or sleeves that cover their sharp tips when not in use to protect users and/or the tips.

The device 800 includes an adjustable stop 41 that can prevent the probe 806 from contacting the actuator 808 or the sensor 813.

Figure 9:
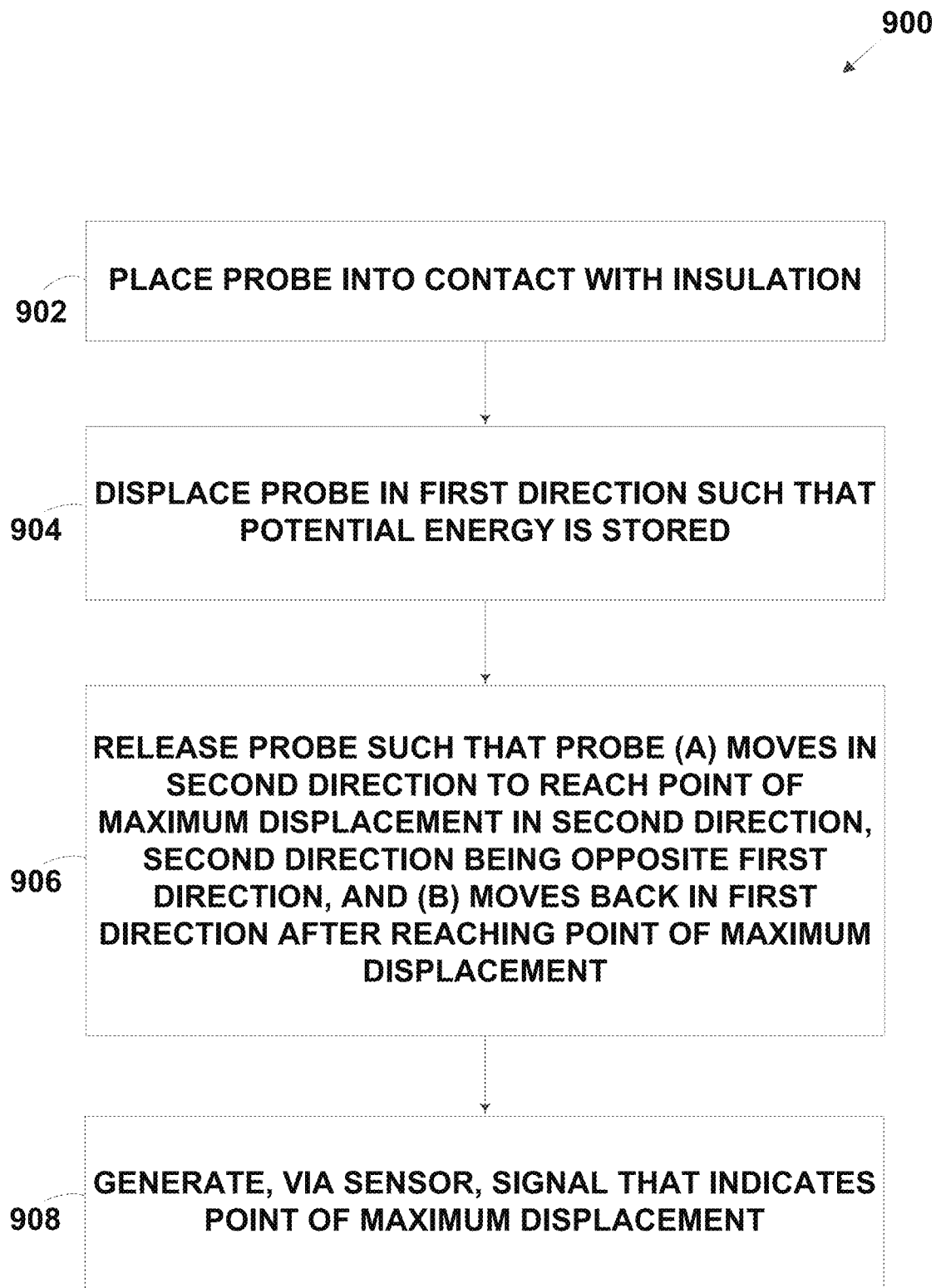
FIG. 9 is a block diagram of a method for determining the density of insulation according to one embodiment of the disclosure.

FIG. 9 is a block diagram of a method 900 for determining the density of insulation (e.g., within a cavity), for example, using any of the devices 100, 700, or 800.

At block 902, the method 900 includes placing a probe into contact with the insulation. In preferred embodiments, the probe is placed into contact with the insulation after block 904 is performed, that is, after the probe is displaced in the first direction (see below). As illustrated in FIG. 7, the probe 706 (e.g., the end 721 of the probe 706) can be placed into contact with the insulation 102 within the cavity 104. As alternatively illustrated in FIG. 8, the probe 806 (e.g., the end 821 of the probe 806) can be placed into the contact with the insulation 102 within the cavity 104. In either case, the end 721 or the end 821 can be surrounded by the insulation 102 after insertion of the probe. Additionally, the protrusion 718 or the protrusion 818 can be inserted into the insulation 102 to stabilize the device during use of the device. Additionally or alternatively, block 902 may be performed using any techniques described above as related to block 202 of the method 200. In some embodiments, the probe 706 and/or the probe 806 include respective sharp cutting surfaces that can be used to cut a hole in a (e.g., paper or fabric) barrier that encloses a cavity such that the hole in the barrier allows freedom of movement for the probe.

At block 904, the method 900 includes displacing the probe in a first direction such that potential energy is stored. In preferred embodiments, the probe is displaced in the first direction before being placed into contact with the insulation. For example, the probe 706 can be displaced in a first direction 795 via magnetic attraction of the actuator 708 or by hand. That is, the control system 712 can provide an excitation current 739 to the actuator 708 such that the probe 706 (e.g., the magnetic component 711 of the probe 706) is attracted to the actuator 708. The potential energy can be stored via the spring 755. The magnetic component 711 typically includes a ferromagnetic material.

Similarly, the probe 806 can be displaced in the first direction 795 via magnetic attraction of the actuator 808 or by hand. That is, the control system 812 can provide an excitation current 839 to the actuator 808 such that the probe 806 (e.g., the ferromagnetic component 811 of the probe 806) is attracted to the actuator 808. The potential energy can be stored by a spring-loaded joint at the end 817, by bending of the probe 806, or by other means.

In some embodiments, the potential energy is stored by holding the probe 706 or the probe 806 in place with a mechanical latch (not shown).

At block 906, the method 900 includes releasing the probe such that the probe (a) moves in a second direction to reach a point of maximum displacement in the second direction, the second direction being opposite the first direction, and/or (b) moves back in the first direction after reaching the point of maximum displacement.

For example, the control system 712 may discontinue providing the excitation current 739 to the actuator 708 to release the probe 706. In another example, the probe 706 may be manually released. In another example, the probe 706 may be restricted from moving by a mechanical latch and is released by a momentary pulse being delivered to actuator 708 thus greatly reducing the power consumption of the actuator. In any event, upon release, the probe 706 will begin moving in the second direction 796 via conversion of potential energy stored by the spring 755 or the probe 706 into kinetic energy. The end 721 of the probe 706 will eventually decelerate and reach a point of maximum displacement in the second direction 796. The stiffness of the probe 706 or the operation of the actuator 708 might then cause the end 721 to move back in the first direction 795.

By additional example, the control system 812 may discontinue providing the excitation current 839 to the actuator 808 to release the probe 806. In another example, the probe 806 may be manually released or released by decreasing the power provided to the electromagnet, or reversing the polarity of the electromagnet by reversing the direction of current flow through the coil of the electromagnet. In any event, upon release, the probe 806 will begin moving in the second direction 796 via conversion of potential energy stored by a spring-loaded joint or the probe 806 into kinetic energy. Potential energy of the probe 806 might also be stored in the form of a repulsive magnetic field between the magnetic component 863 and the magnetic component 861. The end 821 of the probe 806 will eventually decelerate and reach a point of maximum displacement in the second direction 796. The stiffness of the probe 806 or the operation of the actuator 808 might then cause the end 821 to move back in the first direction 795.

At block 908, the method 900 includes generating, via a sensor, a signal that indicates the point of maximum displacement. For example, the sensor 713 can generate the signal 719 that represents the point of maximum displacement of the probe 706. Or, the sensor 813 can generate the signal 819 that represents the point of maximum displacement of the probe 806. As noted above the signal 719 can be generated via movement of the magnetic component 709 with respect to the sensor 713. The signal 819 can be generated via movement of the magnetic component 809 (e.g., a permanent magnet) with respect to the sensor 813.

In various examples, the control system 712 can use the signal 719 to determine the density of the insulation 102 (e.g., based on known characteristics of the insulation 102). Similarly, the control system 812 can use the signal 819 to determine the density of the insulation 102 (e.g., based on known characteristics of the insulation 102).

Additionally, the input device 724 may receive input representing the known characteristics of the insulation 102, and the control system 712 can use the received input to determine the density of insulation 102. The input device 824 and the control system 812 can operate similarly as well.

In various examples, an output device can provide output characterizing the generated signal. Additionally or alternatively, block 908 may be performed using any techniques described above as related to block 206 of the method 200.

Figure 10:
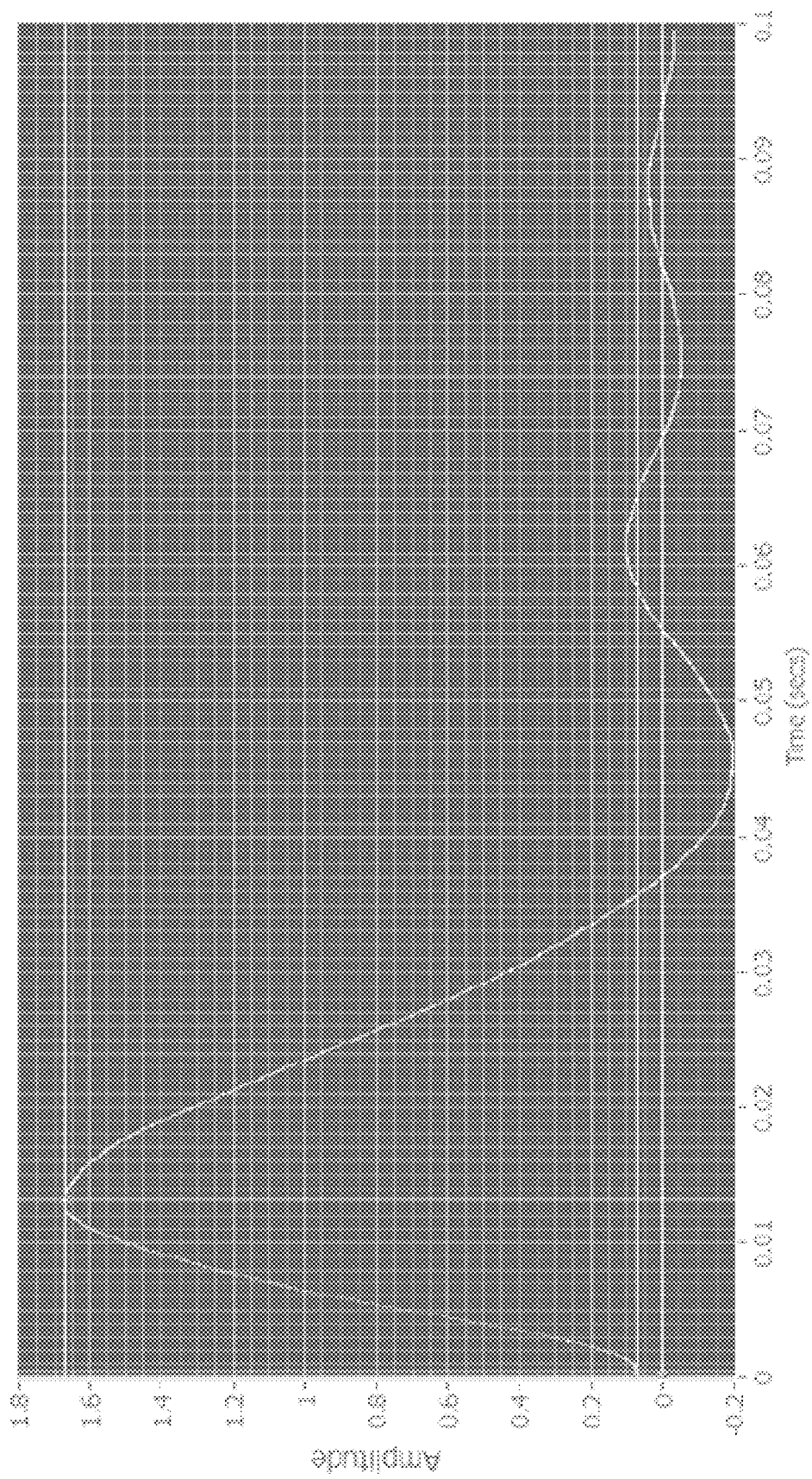
FIG. 10 shows experimental results of a method for determining the density of insulation according to one embodiment of the disclosure.

FIG. 10 shows experimental results of a method (e.g., the method 900) for determining the density of insulation. The horizontal axis depicts time in seconds and the vertical axis depicts instantaneous voltage of the signal 719 or the signal 819. This voltage might represent displacement and/or velocity of the probe 706 or the probe 806 in the direction 796, for example. Via experimental techniques and statistical analysis, one can determine a correlative function between the maximum voltage of the signal 719 or the signal 819 (e.g., maximum displacement of the probe) and density of the insulation 102. Generally, the density of the insulation 102 will correlate negatively with maximum displacement of the probe.

Additional aspects of the disclosure are exemplified by the following numbered embodiments, which can be combined in any logical combination:

Embodiment 1. A device for determining the density of insulation (e.g., in a cavity), the device comprising:
- a probe configured to be inserted into insulation such that the probe contacts the insulation;
- an actuator configured to cause the probe to oscillate;
- a sensor configured to sense the oscillation of the probe; and
- a control system configured to cause the actuator to oscillate the probe,
- the sensor being configured to generate a signal that represents the density of insulation.

Embodiment 2. The device of embodiment 1, wherein the probe comprises a non-magnetic material.

Embodiment 3. The device of any of embodiments 1-2, further comprising a first base component, wherein the probe is coupled to the first base component at a first end of the probe and configured to oscillate at a second end of the probe.

Embodiment 4. The device of embodiment 3, further comprising a second base component that is coupled to the first base component, the actuator, and the sensor.

Embodiment 5. The device of embodiment 4, further comprising a protrusion that extends from the second base component.

Embodiment 6. The device of embodiment 5, wherein the protrusion comprises a retractable or non-retractable needle.

Embodiment 7. The device of any of embodiments 1-6, wherein the probe comprises one or more retractable or non-retractable needles.

Embodiment 8. The device of any of embodiments 1-7, wherein the sensor comprises a coil of wire that defines a gap, and wherein the probe comprises a magnetic component that is configured to move within the gap and is magnetically coupled to the coil of wire.

Embodiment 9. The device of embodiment 8, wherein the sensor is configured to generate the signal via the sensor sensing movement of the magnetic component through the gap.

Embodiment 10. The device of any of embodiments 1-9, wherein the actuator comprises an electromagnet, and wherein the control system is configured to provide an excitation current to the electromagnet to oscillate the probe.

Embodiment 11. The device of any of embodiments 1-9, wherein the actuator comprises a hammer, and wherein the control system is configured to cause the hammer to strike the probe to oscillate the probe.

Embodiment 12. The device of any of embodiments 1-11, wherein the control system is configured to use the generated signal to determine the density of insulation (e.g., digitizing the signal and processing the signal.

Embodiment 13. The device of embodiment 12, wherein the insulation comprises fibrous insulation material.

Embodiment 14. The device of any of embodiments 12-13, wherein the control system is configured to determine the density of insulation based on known characteristics of the insulation.

Embodiment 15. The device of embodiment 14, further comprising an input device, wherein the control system is configured to
- receive input, from the input device, representing the known characteristics of the insulation; and
- using the received input to determine the density of insulation.

Embodiment 16. The device of any of embodiments 12-15, wherein the control system is configured to:
- use the signal to determine a decay constant representing a degree to which the insulation resists oscillation of the probe; and
- use the determined decay constant to determine the density of insulation.

Embodiment 17. The device of embodiment 16, wherein the control system is configured to compare the determined decay constant to a decay constant representing a degree to which ambient air and/or characteristics of the device resist oscillation of the probe.

Embodiment 18. The device of any of embodiments 12-17, wherein the control system is configured to:
- use the signal to determine a decay time during which a displacement amplitude of the probe is attenuated by the insulation by a predetermined amount; and
- use the determined decay time to determine the density of insulation.

Embodiment 19. The device of embodiment 18, wherein the control system is configured to use the determined decay time to determine the density of the insulation by comparing the determined decay time to a second decay time during which the displacement amplitude of the probe attenuates by the predetermined amount when oscillating in air.

Embodiment 20. The device of embodiment 19, wherein the control system is configured to compare the determined decay time to the second decay time by subtracting the determined decay time from the second decay time.

Embodiment 21. The device of any of embodiments 1-20, wherein the control system is configured to perform a low pass filter operation upon the signal to determine the density of insulation.

Embodiment 22. The device of any of embodiments 1-21, wherein the control system is configured to sample the signal at a sampling rate within a range of 15 kHz to 25 kHz to determine the density of insulation.

Embodiment 23. The device of embodiment 22, wherein the control system is configured to select one or more samples of the signal that are within a predetermined range of magnitude to determine the density of insulation.

Embodiment 24. The device of any of embodiments 22-23, wherein the control system is configured to perform a square root operation on at least one sample of the signal to determine the density of insulation.

Embodiment 25. The device of any of embodiments 22-24, wherein the control system is configured to determine a sum of one or more samples of the signal to determine the density of insulation.

Embodiment 26. The device of any of embodiments 22-25, wherein the control system is configured to multiply one or more samples of the signal by a scaling factor to determine the density of insulation.

Embodiment 27. The device of any of embodiments 1-26, wherein the control system is configured to rectify the signal to determine the density of insulation.

Embodiment 28. The device of any of embodiments 1-27, wherein the control system is configured to cause the actuator to impart an impulse force to the probe via the actuator.

Embodiment 29. The device of any of embodiments 1-28, wherein the control system is configured to cause the actuator to impart an oscillatory driving force to the probe via the actuator.

Embodiment 30. The device of any of embodiments 1-29, wherein the control system is configured to cause the actuator to oscillate the probe within the insulation until the oscillation of the probe reaches a substantially steady state amplitude, and wherein the signal represents the oscillation of the probe after the oscillation reaches the substantially steady state amplitude.

Embodiment 31. The device of any of embodiments 1-30, wherein the control system is configured to use the signal to determine the density of insulation by:
rectifying the signal;
integrating the rectified signal over a predetermined duration after onset of oscillation of the probe to determine an amount of oscillation energy absorbed by the insulation; and
comparing the amount of oscillation energy absorbed by the insulation to an amount of oscillation energy that is absorbed in a reference substance (e.g., any gas, liquid, solid, or insulation material) during the predetermined duration when the probe oscillates in air.

Embodiment 32. The device of any of embodiments 1-31, further comprising an output device, wherein the control system is further configured to cause the output device to provide output characterizing the determined density of insulation.

Embodiment 33. The device of any of embodiments 1-31, further comprising an output device, wherein the control system is further configured to cause the output device to provide output characterizing the generated signal.

Embodiment 34. The device of any of embodiments 32-33, wherein the output device comprises an oscilloscope.

Embodiment 35. The device of any of embodiments 32-33, wherein the output device comprises a voltmeter.

Embodiment 36. The device of any of embodiments 32-33, wherein the output device comprises an analog-to-digital converter.

Embodiment 37. The device of any of embodiments 32-33, wherein the output device comprises a display screen.

Embodiment 38. The device of any of embodiments 1-37, wherein the signal represents displacement and/or velocity of the probe relative to the sensor with respect to time.

Embodiment 39. The device of any of embodiments 1-38,
wherein the actuator is a first actuator configured to oscillate the probe within a first plane,
wherein the sensor is a first sensor configured to sense oscillation of the probe within the first plane, the device further comprising:
a second actuator configured to oscillate the probe in a second plane that is perpendicular to the first plane; and
a second sensor configured to sense oscillation of the probe within the second plane,
wherein the second sensor is configured to generate a signal that represents the displacement and/or velocity of the probe within the second plane with respect to time.

Embodiment 40. The device of any of embodiments 1-39, further comprising a third base component that is coupled to the first base component and the actuator, wherein the actuator comprises a first electromagnet that is positioned on a first side of the probe and coupled to the second base component and a second electromagnet that is positioned on a second opposing side of the probe and coupled to the third base component.

Embodiment 41. The device of embodiment 40, further comprising a protrusion that extends from the third base component.

Embodiment 42. The device of embodiment 41, wherein the protrusion that extends from the third base component comprises a retractable or non-retractable needle.

Embodiment 43. The device of any of embodiments 40-42, wherein the probe comprises a magnetic component positioned between the first electromagnet and the second electromagnet.

Embodiment 44. A method for determining the density of insulation (e.g., in a cavity), for example, using a device according to any of embodiments 1-43, the method comprising:
placing a probe into contact with the insulation;
causing, via an actuator, the probe to oscillate while in contact with the insulation; and
generating, via a sensor, a signal that represents the density of insulation.

Embodiment 45. The method of embodiment 44, wherein the insulation comprises fibrous insulation material.

Embodiment 46. The method of any of embodiments 44-45, wherein the probe comprises a non-magnetic material.

Embodiment 47. The method of any of embodiments 44-46, wherein the probe comprises one or more retractable or non-retractable needles.

Embodiment 48. The method of any of embodiments 44-47, wherein the sensor comprises a coil of wire that defines a gap, and wherein the probe comprises a magnetic component that is configured to move within the gap and is magnetically coupled to the coil of wire.

Embodiment 49. The method of embodiment 48, wherein generating the signal comprises generating the signal by moving the magnetic component through the gap.

Embodiment 50. The method of any of embodiments 44-49, wherein placing the probe into contact with the insulation comprises placing the probe such that at least an end of the probe is surrounded by the insulation.

Embodiment 51. The method of any of embodiments 44-50, wherein the actuator comprises an electromagnet, and wherein causing the probe to oscillate comprises providing an excitation current to the electromagnet.

Embodiment 52. The method of any of embodiments 44-51, wherein the actuator comprises a hammer, and wherein the causing the probe to oscillate comprises striking the probe with the hammer.

Embodiment 53. The method of any of embodiments 44-52, further comprising inserting a protrusion into the insulation to stabilize the device, wherein the protrusion is coupled to the probe via one or more base components.

Embodiment 54. The method of embodiment 53, wherein the protrusion comprises a retractable or non-retractable needle.

Embodiment 55. The method of any of embodiments 44-54, further comprising using the generated signal to determine the density of insulation.

Embodiment 56. The method of embodiment 55, wherein using the signal to determine the density of insulation comprises determining the density of insulation based on known characteristics of the insulation.

Embodiment 57. The method of embodiment 56, further comprising:
  receiving input, from an input device, representing the known characteristics of the insulation; and
  using the received input to determine the density of insulation.

Embodiment 58. The method of any of embodiments 54-57, wherein using the signal to determine the density of insulation comprises:
  using the signal to determine a decay constant representing a degree to which the insulation resists oscillation of the probe; and
  using the determined decay constant to determine the density of insulation.

Embodiment 59. The method of embodiment 58, wherein using the determined decay constant to determine the density of insulation comprises comparing the determined decay constant to a decay constant representing a degree to which ambient a reference substance (e.g., any gas, liquid, solid, or insulation material) and/or characteristics of the probe resist oscillation of the probe.

Embodiment 60. The method of any of embodiments 44-59, wherein causing the probe to oscillate comprises imparting an impulse force to the probe via the actuator.

Embodiment 61. The method of embodiment 44-60, wherein using the signal to determine the density of insulation comprises:
  using the signal to determine a decay time during which a displacement amplitude of the probe is attenuated by the insulation by a predetermined amount after imparting the impulse force; and
  using the determined decay time to determine the density of insulation.

Embodiment 62. The method of embodiment 61, wherein using the determined decay time to determine the density of insulation comprises comparing the determined decay time to a second decay time during which the displacement amplitude of the probe attenuates by the predetermined amount when oscillating in a reference substance (e.g., any gas, liquid, solid, or insulation material).

Embodiment 63. The method of embodiment 62, wherein comparing the determined decay time to the second decay time comprises subtracting the determined decay time from the second decay time.

Embodiment 64. The method of any of embodiments 44-59, wherein causing the probe to oscillate comprises causing the actuator to impart an oscillatory driving force to the probe via the actuator until the oscillation of the probe reaches a substantially steady state amplitude, and wherein the signal represents the oscillation of the probe after the oscillation reaches the substantially steady state amplitude.

Embodiment 65. The method of any of embodiments 44-64, further comprising performing a low pass filter operation upon the signal to determine the density of insulation.

Embodiment 66. The method of any of embodiments 44-65, further comprising sampling the signal at a sampling rate within a range of 15 kHz to 25 kHz to determine the density of insulation.

Embodiment 67. The method of embodiment 66, further comprising selecting one or more samples of the signal that are within a predetermined range of magnitude to determine the density of insulation.

Embodiment 68. The method of any of embodiments 66-67, further comprising performing a square root operation on at least one sample of the signal to determine the density of insulation.

Embodiment 69. The method of any of embodiments 66-68, further comprising determining a sum of one or more samples of the signal to determine the density of insulation.

Embodiment 70. The method of any of embodiments 66-69, further comprising multiplying one or more samples of the signal by a scaling factor to determine the density of insulation.

Embodiment 71. The method of any of embodiments 44-70, further comprising rectifying the signal to determine the density of insulation.

Embodiment 72. The method of any of embodiments 54-71, wherein using the signal to determine the density of insulation comprises:
  rectifying the signal;
  integrating the rectified signal over a predetermined duration after onset of oscillation of the probe to determine an amount of oscillation energy absorbed by the insulation; and
  comparing the amount of oscillation energy absorbed by the insulation to an amount of oscillation energy that is absorbed in a reference substance (e.g., any gas, liquid, solid, or insulation material) during the predetermined duration when the probe oscillates in air.

Embodiment 73. The method of any of embodiments 54-72, further comprising providing, via an output device, output characterizing the determined density of insulation.

Embodiment 74. The method of any of embodiments 44-73, further comprising providing, via an output device, output characterizing the generated signal.

Embodiment 75. The method of any of embodiments 73-74, wherein the output device comprises an oscilloscope.

Embodiment 76. The method of any of embodiments 73-74, wherein the output device comprises a voltmeter.

Embodiment 77. The method of any of embodiments 73-74, wherein the output device comprises an analog-to-digital converter.

Embodiment 78. The method of any of embodiments 73-74, wherein the output device comprises a display screen.

Embodiment 79. The method of any of embodiments 44-78, wherein the signal represents displacement and/or velocity of the probe relative to the sensor with respect to time.

Embodiment 80. The method of any of embodiments 44-79,
  wherein the actuator is a first actuator and causing the probe to oscillate comprises causing the probe to oscillate within a first plane, wherein the sensor is a first sensor configured to sense oscillation of the probe within the first plane, the method further comprising:

causing, via a second actuator, the probe to oscillate within a second plane that is perpendicular to the first plane; and sensing, via a second sensor, oscillation of the probe within the second plane, generating, via the second sensor, a signal that represents the displacement and/or velocity of the probe within the second plane with respect to time.

Embodiment 81. The method of any of embodiments 44-80, wherein the actuator comprises a first electromagnet that is positioned on a first side of the probe and a second electromagnet that is positioned on a second opposing side of the probe, and wherein causing the probe to oscillate via the actuator while in contact with the insulation comprises alternatingly:

repelling or attracting, via the first electromagnet, the probe toward the second electromagnet, and repelling or attracting, via the second electromagnet, the probe toward the first electromagnet.

Embodiment 82. The method of embodiment 81, wherein the probe comprises a magnetic component positioned between the first electromagnet and the second electromagnet, wherein repelling or attracting the probe via the first electromagnet toward the second electromagnet comprises repelling or attracting the magnetic component, and wherein repelling or attracting the probe via the second electromagnet toward the first electromagnet comprises repelling or attracting the magnetic component.

Embodiment 83. The method of any of embodiments 81-82, wherein repelling or attracting the probe via the first electromagnet toward the second electromagnet comprises exciting the first electromagnet with a first DC-pulsed current, and wherein repelling or attracting the probe via the second electromagnet toward the first electromagnet comprises exciting the second electromagnet with a second DC-pulsed current.

Embodiment 84. The method of embodiment 83, wherein first DC-pulsed current is out of phase with the second DC-pulsed current.

Embodiment 85. A device for determining the density of insulation, the device comprising:

a probe configured to be inserted into insulation such that the probe contacts the insulation;

a base component to which the probe is mechanically coupled; and a sensor configured to generate a signal representing displacement and/or velocity of the probe within the insulation, wherein the displacement and/or velocity of the probe indicates the density of insulation.

Embodiment 86. The device of embodiment 85, further comprising a control system configured to cause displacement of the probe and/or configured to use the generated signal to determine the density of insulation (e.g., digitizing the signal and processing the signal.

Embodiment 87. The device of any of embodiments 85-86, wherein the probe comprises a non-magnetic material.

Embodiment 88. The device of any of embodiments 85-87, wherein the probe is coupled to the base component at a first end of the probe such that a second opposing end of the probe is configured to be inserted into the insulation.

Embodiment 89. The device of any of embodiments 85-87, wherein the probe is coupled to the base component at a location between first and second opposing ends of the probe.

Embodiment 90. The device of embodiment 89, wherein the probe further comprises a counterweight located at the first end of the probe, wherein the second end of the probe is configured to be inserted into the insulation.

Embodiment 91. The device of any of embodiments 85-90, further comprising a protrusion that extends from the base component, the protrusion being configured to be inserted into the insulation.

Embodiment 92. The device of embodiment 91, wherein the protrusion comprises a retractable or non-retractable needle.

Embodiment 93. The device of any of embodiments 85-92, wherein the probe comprises one or more retractable or non-retractable needles.

Embodiment 94. The device of any of embodiments 85-93, wherein the sensor comprises a coil of wire that defines a gap, and wherein the probe comprises a magnetic component that is configured to move with respect to the gap and is magnetically coupled to the coil of wire.

Embodiment 95. The device of embodiment 94, wherein the sensor is configured to generate the signal via sensing movement of the magnetic component with respect to the gap.

Embodiment 96. The device of any of embodiments 86-95, further comprising an actuator configured to displace the probe.

Embodiment 97. The device of embodiment 96, wherein the actuator comprises an electromagnet, the control system being configured to provide an excitation current to the electromagnet to displace the probe.

Embodiment 98. The device of embodiment 97, wherein the actuator comprises a hammer, and wherein the control system is configured to cause the hammer to strike the probe to displace the probe.

Embodiment 99. The device of any of embodiments 85-98, wherein the probe is coupled to the base component via a spring.

Embodiment 100. The device of any of embodiments 85-99, further comprising a mechanical latch configured to restrict movement of the probe.

Embodiment 101. The device of any of embodiments 85-100, further comprising a magnetic component attached to the base component that is configured to repel the probe away from the sensor or attract it towards the sensor.

Embodiment 102. The device of any of embodiments 86-101, wherein the control system is configured to use the generated signal to determine the density of insulation (e.g., digitizing the signal and processing the signal.

Embodiment 103. The device of any of embodiments 86-102, wherein the control system is configured to determine the density of insulation based on known characteristics of the insulation.

Embodiment 104. The device of embodiment 103, further comprising an input device, wherein the control system is configured to:

receive input, from the input device, representing the known characteristics of the insulation; and use the received input to determine the density of insulation.

Embodiment 105. The device of any of embodiments 85-104, further comprising an output device, wherein the control system is further configured to cause the output device to provide output characterizing the determined density of insulation.

Embodiment 106. The device of any of embodiments 85-104, further comprising an output device, wherein the control system is further configured to cause the output device to provide output characterizing the generated signal.

Embodiment 107. The device of any of embodiments 105-106, wherein the output device comprises an oscilloscope.

Embodiment 108. The device of any of embodiments 105-107, wherein the output device comprises a voltmeter.

Embodiment 109. The device of any of embodiments 105-108, wherein the output device comprises an analog-to-digital converter.

Embodiment 110. The device of any of embodiments 105-109, wherein the output device comprises a display screen.

Embodiment 111. The device of any of embodiments 85-110, wherein the signal represents displacement and/or velocity of the probe relative to the sensor with respect to time.

Embodiment 112. A method for determining the density of insulation (e.g., within a cavity), for example, using a device according to any of embodiments 85-111, the method comprising:
  placing a probe into contact with the insulation;
  displacing the probe in a first direction such that potential energy is stored;
  releasing the probe such that the probe (a) moves in a second direction to reach a point of maximum displacement in the second direction, the second direction being opposite the first direction, and/or (b) moves back in the first direction after reaching the point of maximum displacement; and
  generating, via a sensor, a signal that indicates the point of maximum displacement.

Embodiment 113. The method of embodiment 112, wherein the insulation comprises fibrous insulation material.

Embodiment 114. The method of any of embodiments 112-113, wherein the probe comprises a non-magnetic material.

Embodiment 115. The method of any of embodiments 112-114, wherein the probe comprises one or more retractable or non-retractable needles.

Embodiment 116. The method of any of embodiments 112-115, wherein the sensor comprises a coil of wire that defines a gap, and wherein the probe comprises a magnetic component that is configured to move with respect to the gap and is magnetically coupled to the coil of wire.

Embodiment 117. The method of embodiment 116, wherein generating the signal comprises generating the signal via movement of the magnetic component with respect to the gap.

Embodiment 118. The method of any of embodiments 112-117, wherein placing the probe into contact with the insulation comprises placing the probe such that at least an end of the probe is surrounded by the insulation.

Embodiment 119. The method of any of embodiments 112-118, wherein displacing the probe in the first direction comprises displacing the probe with an electromagnet.

Embodiment 120. The method of embodiment 119, wherein releasing the probe comprises shutting off the electromagnet.

Embodiment 121. The method of any of embodiments 112-120, wherein displacing the probe in the first direction comprises manually displacing the probe.

Embodiment 122. The method of embodiment 121, wherein the potential energy is stored by holding the probe with a mechanical latch.

Embodiment 123. The method of any of embodiments 112-122, wherein the probe moves in the second direction at least in part due to a magnetic component of the device repelling the probe.

Embodiment 124. The method of any of embodiments 112-123, further comprising inserting a protrusion into the insulation to stabilize the device, wherein the protrusion is coupled to the probe via a base component.

Embodiment 125. The method of embodiment 124, wherein the protrusion comprises a retractable or non-retractable needle.

Embodiment 126. The method of any of embodiments 112-125, further comprising using the generated signal to determine the density of insulation.

Embodiment 127. The method of embodiment 126, wherein using the signal to determine the density of insulation comprises determining the density of insulation based on known characteristics of the insulation.

Embodiment 128. The method of embodiment 127, further comprising:
  receiving input, from an input device, representing the known characteristics of the insulation; and
  using the received input to determine the density of insulation.

Embodiment 129. The method of any of embodiments 126-128, further comprising providing, via an output device, output characterizing the determined density of insulation.

Embodiment 130. The method of any of embodiments 112-128, further comprising providing, via an output device, output characterizing the generated signal.

Embodiment 131. The method of any of embodiments 129-130, wherein the output device comprises an oscilloscope.

Embodiment 132. The method of any of embodiments 129-130, wherein the output device comprises a voltmeter.

Embodiment 133. The method of any of embodiments 129-130, wherein the output device comprises an analog-to-digital converter.

Embodiment 134. The method of any of embodiments 129-130, wherein the output device comprises a display screen.

Embodiment 135. The method of any of embodiments 112-134, wherein the signal represents displacement of the probe relative to the sensor with respect to time.

Embodiment 136. The method of any of embodiments 112-135, wherein displacing the probe in the first direction comprises displacing the probe in the first direction prior to placing the probe into contact with the insulation.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:
1. A device for determining the density of insulation, the device comprising:
  a probe configured to be inserted into insulation such that the probe contacts the insulation;

a first actuator configured to cause the probe to oscillate within a first plane;

a first sensor configured to sense the oscillation of the probe within the first plane;

a second actuator configured to oscillate the probe in a second plane that is perpendicular to the first plane;

a second sensor configured to sense oscillation of the probe within the second plane, the configured to generate a signal that represents the displacement and/or velocity of the probe within the second plane with respect to time; and a control system configured to cause the first actuator and the second actuator to oscillate the probe, the first sensor and the second sensor each being configured to generate a signal that represents the density of insulation, and the control system is configured to use the generated signals to determine the density of insulation.

2. The device of claim 1, wherein the probe comprises a non-magnetic material.

3. The device of claim 1, further comprising a first base component, wherein the probe is coupled to the first base component at a first end of the probe and configured to oscillate at a second end of the probe.

4. The device of claim 1, wherein the sensor comprises a coil of wire that defines a gap, and wherein the probe comprises a magnetic component that is configured to move within the gap and is magnetically coupled to the coil of wire.

5. The device of claim 1, wherein the control system is configured to cause the actuator to oscillate the probe within the insulation until the oscillation of the probe reaches a substantially steady state amplitude, and wherein the signal represents the oscillation of the probe after the oscillation reaches the substantially steady state amplitude.

6. The device of claim 1, wherein the control system is configured to use the signal to determine the density of insulation by:

rectifying the signal;

integrating the rectified signal over a predetermined duration after onset of oscillation of the probe to determine an amount of oscillation energy absorbed by the insulation; and comparing the amount of oscillation energy absorbed by the insulation to an amount of oscillation energy that is absorbed in a reference substance during the predetermined duration when the probe oscillates in air.

7. The device of claim 1, wherein the signal of the first sensor represents displacement and/or velocity of the probe relative to the sensor within the first plane with respect to time, and the signal of the second sensor represents the displacement and/or velocity of the probe within the second plane with respect to time.

8. A method for determining the density of insulation, the method comprising:

placing a probe into contact with the insulation;

causing, via a first actuator, the probe to oscillate within a first plane while in contact with the insulation; and generating, via a first sensor configured to sense oscillation of the probe within the first plane, a signal that represents displacement and/or velocity of the probe within the first plane with respect to time;

causing, via a second actuator, the probe to oscillate within a second plane that is perpendicular to the first plane; and generating, via a second sensor configured to sense oscillation of the probe within the second plane, a signal that represents displacement and/or velocity of the probe within the second plane with respect to time; and using the generated signal to determine the density of insulation.

9. The method of claim 8, wherein the insulation comprises fibrous insulation material.

10. The method of claim 8, wherein the probe comprises a non-magnetic material.

11. The method of claim 8, wherein placing the probe into contact with the insulation comprises placing the probe such that at least an end of the probe is surrounded by the insulation.

12. The method of claim 8, wherein using the signal to determine the density of insulation comprises determining the density of insulation based on known characteristics of the insulation.

13. The method of claim 12, further comprising:

receiving input, from an input device, representing the known characteristics of the insulation; and using the received input to determine the density of insulation.

14. The method of claim 8, wherein causing the probe to oscillate comprises causing the actuator to impart an oscillatory driving force to the probe via the actuator until the oscillation of the probe reaches a substantially steady state amplitude, and wherein the signal represents the oscillation of the probe after the oscillation reaches the substantially steady state amplitude.

15. The method of claim 8, wherein the actuator comprises a first electromagnet that is positioned on a first side of the probe and a second electromagnet that is positioned on a second opposing side of the probe, and wherein causing the probe to oscillate via the actuator while in contact with the insulation comprises alternatingly:

repelling or attracting, via the first electromagnet, the probe toward the second electromagnet, and repelling or attracting, via the second electromagnet, the probe toward the first electromagnet.

16. The method of claim 8, wherein the insulation is fibrous insulation disposed within a wall cavity of a building.

17. The method of claim 16, wherein placing the probe into contact with the fibrous insulation in the cavity comprises inserting the probe through a wallboard bounding the cavity.

18. The method of claim 16, wherein placing the probe into contact with the fibrous insulation in the cavity comprises inserting the probe through a paper or fabric disposed in front of the fibrous insulation.

19. The method of claim 16, wherein placing the probe into contact with the fibrous insulation comprises placing the probe such that at least an end of the probe is surrounded by the fibrous insulation.

20. The method of claim 16, wherein using the signal to determine the density of fibrous insulation comprises determining the density of fibrous insulation based on known characteristics of the fibrous insulation.

21. The method of claim 20, further comprising:

receiving input, from an input device, representing the known characteristics of the fibrous insulation; and using the received input together with the signal to determine the density of fibrous insulation.

\* \* \* \* \*